(12) United States Patent
Nomaguchi et al.

(10) Patent No.: US 12,436,114 B2
(45) Date of Patent: Oct. 7, 2025

(54) SEMICONDUCTOR ANALYSIS SYSTEM

(71) Applicant: Hitachi High-Tech Corporation, Tokyo (JP)

(72) Inventors: Tsunenori Nomaguchi, Tokyo (JP); Yudai Kubo, Tokyo (JP); Hiroyuki Chiba, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 578 days.

(21) Appl. No.: 17/797,304

(22) PCT Filed: Feb. 27, 2020

(86) PCT No.: PCT/JP2020/008058
§ 371 (c)(1),
(2) Date: Aug. 3, 2022

(87) PCT Pub. No.: WO2021/171492
PCT Pub. Date: Sep. 2, 2021

(65) Prior Publication Data
US 2023/0055155 A1    Feb. 23, 2023

(51) Int. Cl.
*H01J 37/26*    (2006.01)
*G01N 1/28*    (2006.01)
(Continued)

(52) U.S. Cl.
CPC ......... *G01N 23/041* (2018.02); *G01N 1/2813* (2013.01); *G01N 23/20025* (2013.01);
(Continued)

(58) Field of Classification Search
None
See application file for complete search history.

(56) References Cited

U.S. PATENT DOCUMENTS

| | | |
|---|---|---|
| 2002/0074496 A1 | 6/2002 | Sadayama |
| 2002/0137350 A1 | 9/2002 | Endoh et al. |
| 2017/0062178 A1 | 3/2017 | Arjavac et al. |

FOREIGN PATENT DOCUMENTS

| | | |
|---|---|---|
| CN | 105510092 A | 4/2016 |
| JP | 2002-174571 A | 6/2002 |

(Continued)

OTHER PUBLICATIONS

International Search Report (PCT/ISA/210) issued in PCT Application No. PCT/JP2020/008058 dated May 12, 2020 with English translation (four (4) pages).

(Continued)

*Primary Examiner* — Eliza W Osenbaugh-Stewart
(74) *Attorney, Agent, or Firm* — Crowell & Moring LLP

(57) ABSTRACT

A semiconductor analysis system includes a machining device that machines a semiconductor wafer to prepare a thin film sample for observation, a transmission electron microscope device that acquires a transmission electron microscope image of the thin film sample, and a host control device that controls the machining device and the transmission electron microscope device. The host control device evaluates the thin film sample based on the transmission electron microscope image, updates acquisition conditions of the transmission electron microscope image based on an evaluation result of the thin film sample, and outputs the updated acquisition conditions to the transmission electron microscope device

5 Claims, 16 Drawing Sheets

(51) Int. Cl.
    *G01N 23/041*      (2018.01)
    *G01N 23/20025*    (2018.01)
    *H01J 37/34*       (2006.01)
    *H01L 21/02*       (2006.01)
    *G01N 23/046*      (2018.01)

(52) U.S. Cl.
    CPC .......... *H01J 37/263* (2013.01); *H01J 37/347* (2013.01); *H01L 21/02002* (2013.01); *G01N 23/046* (2013.01); *H01J 2237/20292* (2013.01); *H01J 2237/2802* (2013.01); *H01J 2237/2807* (2013.01)

(56)         References Cited

FOREIGN PATENT DOCUMENTS

| JP | 2009-115582 A   | 5/2009  |
| JP | 2014-22296 A    | 2/2014  |
| JP | 2016-191714 A   | 11/2016 |
| JP | 2017-69186 A    | 4/2017  |
| TW | 538242 B        | 6/2003  |
| WO | WO 02/075806 A1 | 9/2002  |

OTHER PUBLICATIONS

Japanese-language Written Opinion (PCT/ISA/237) issued in PCT Application No. PCT/JP2020/008058 dated May 12, 2020 (four (4) pages).
Taiwanese-language Office Action issued in Taiwanese Application No. 110103625 dated Dec. 13, 2021 (five (5) pages).

[FIG. 1]
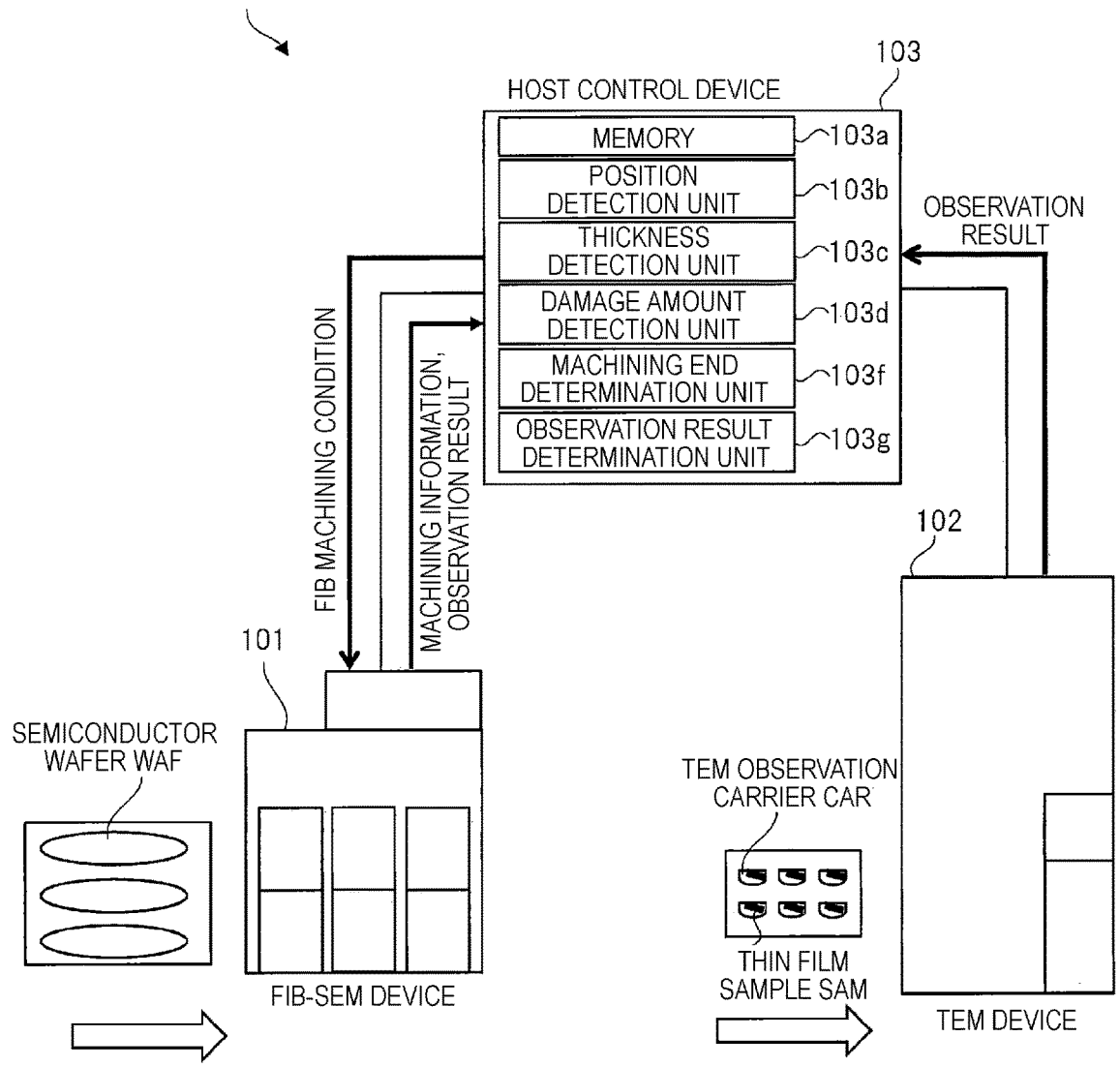

[FIG. 2]
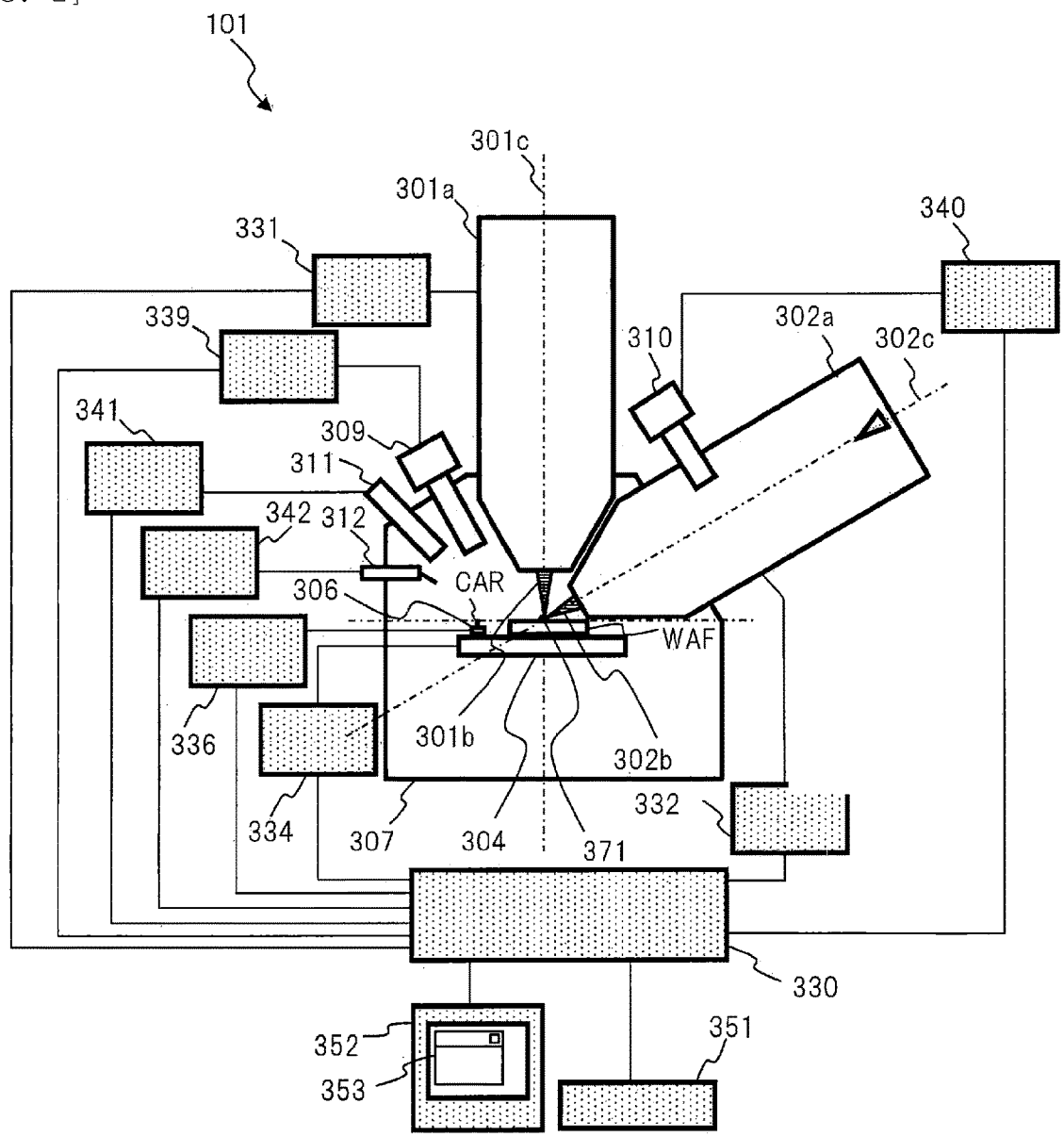

[FIG. 3]
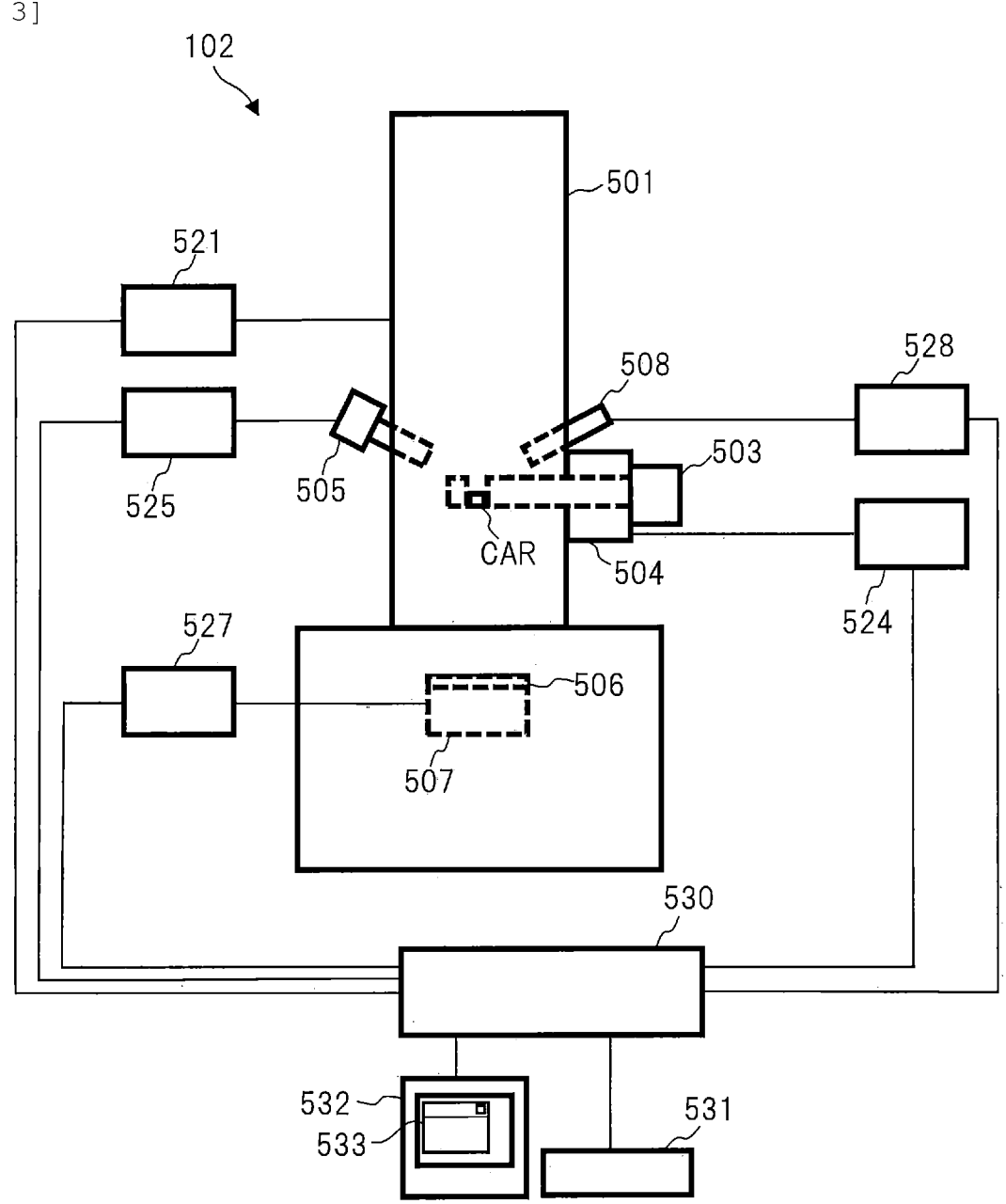

[FIG. 4]
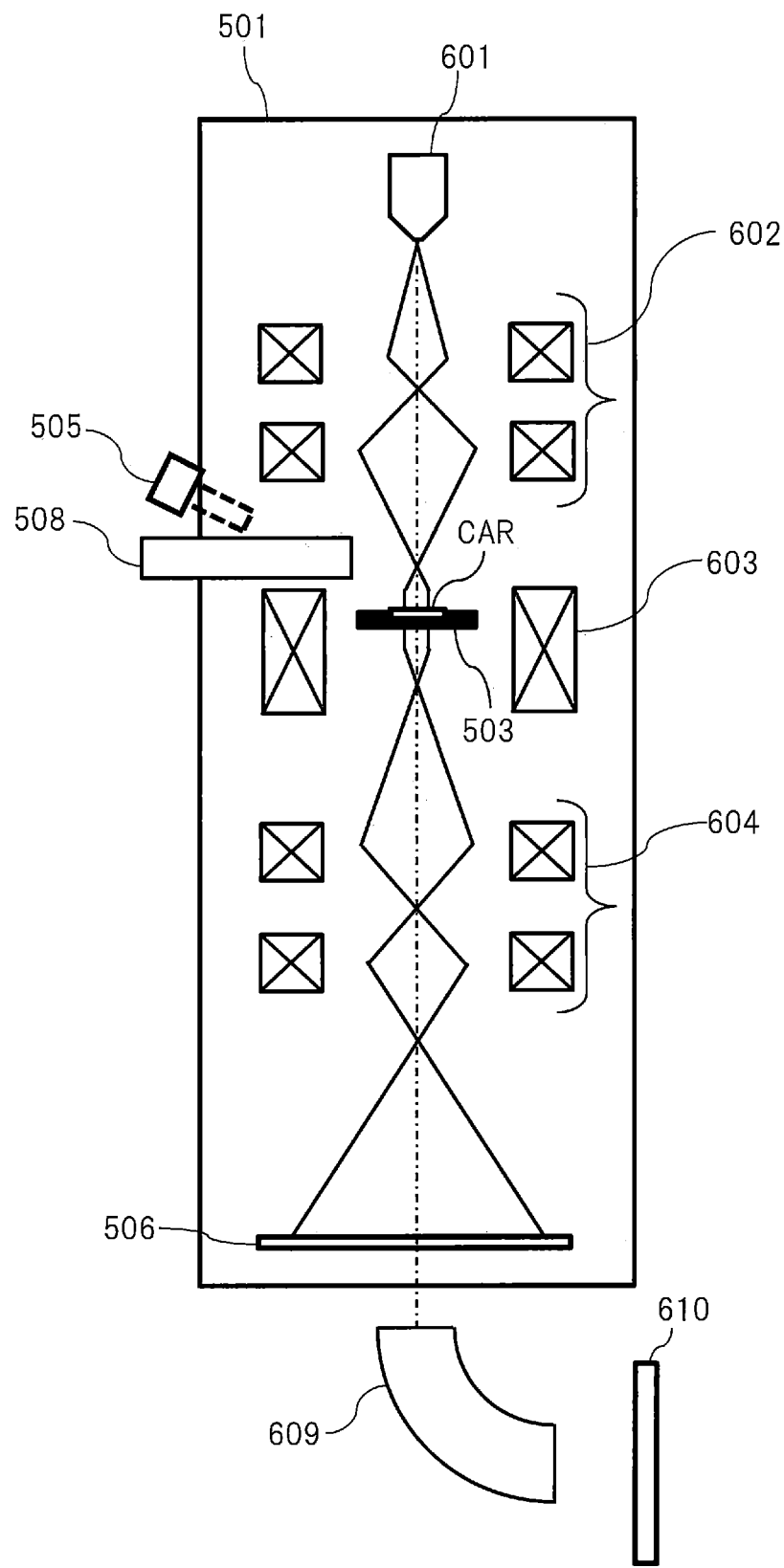

[FIG. 5]
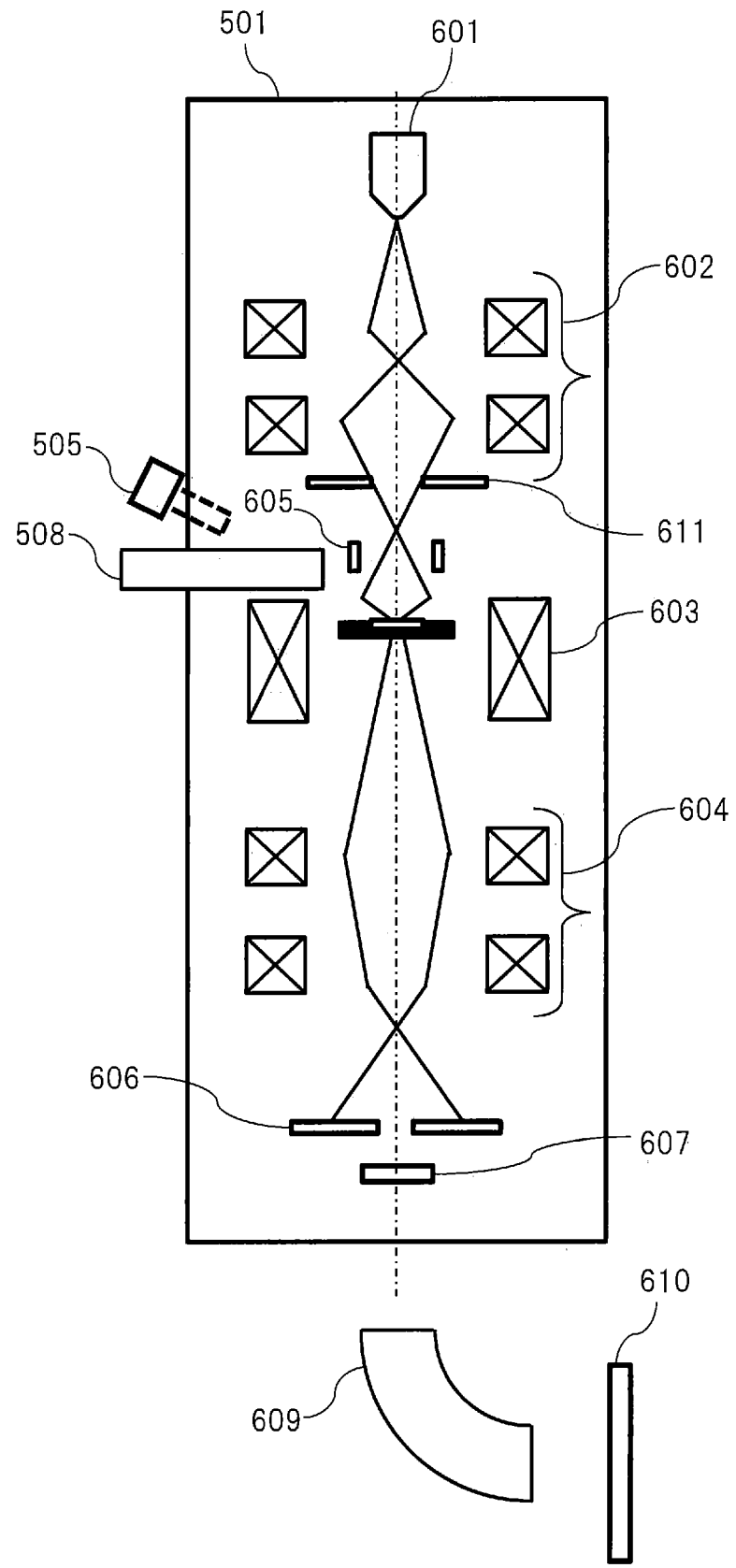

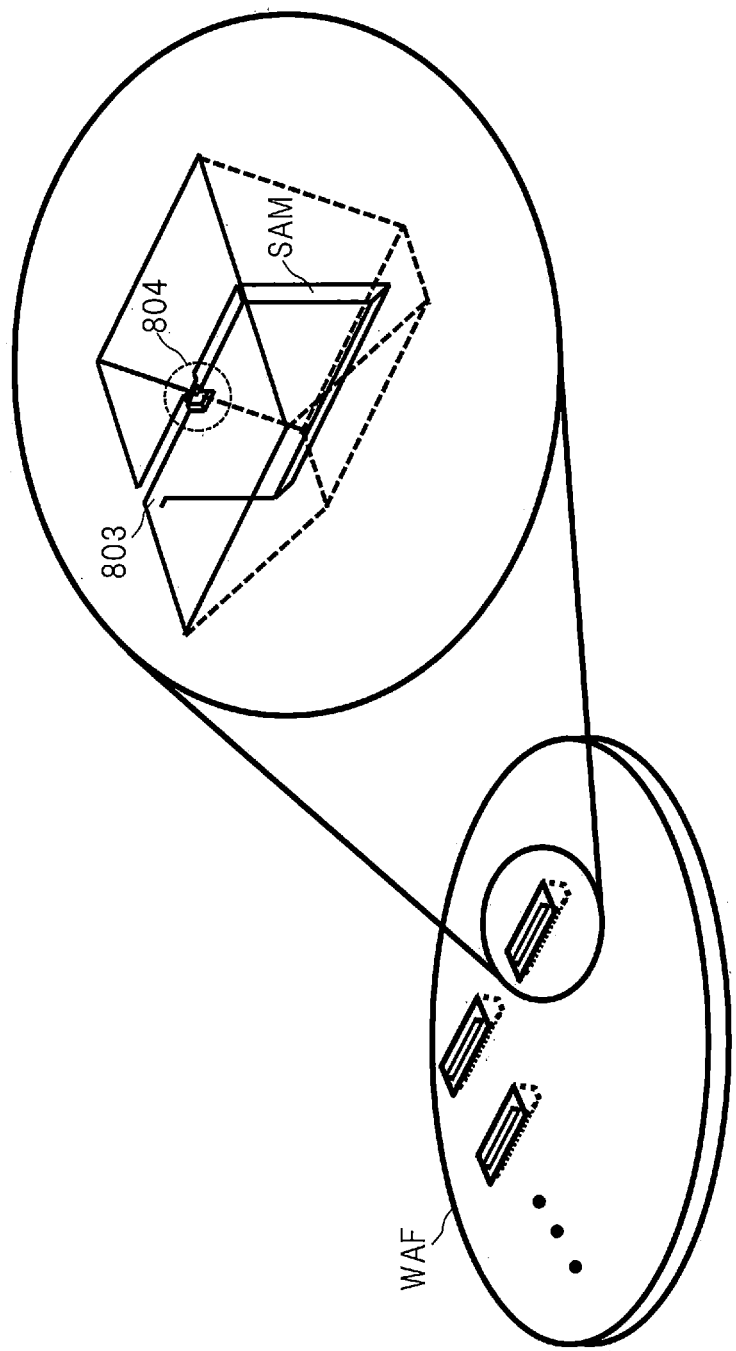

[FIG. 7]
(a)
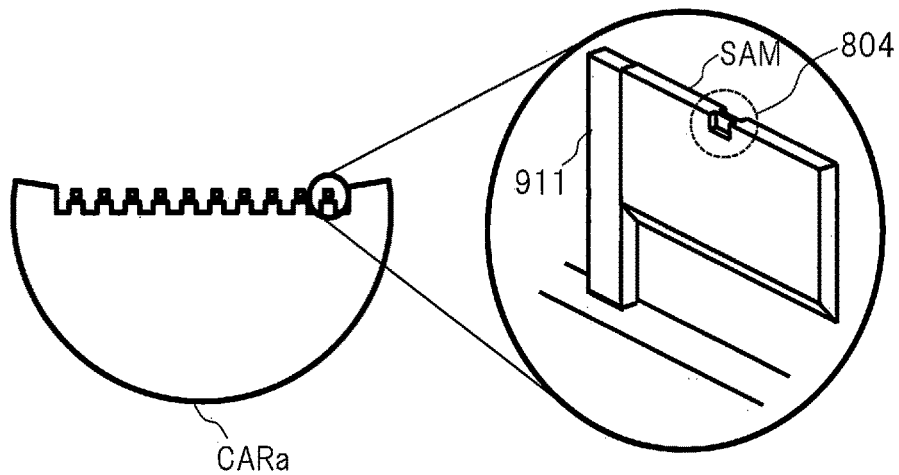
(b)
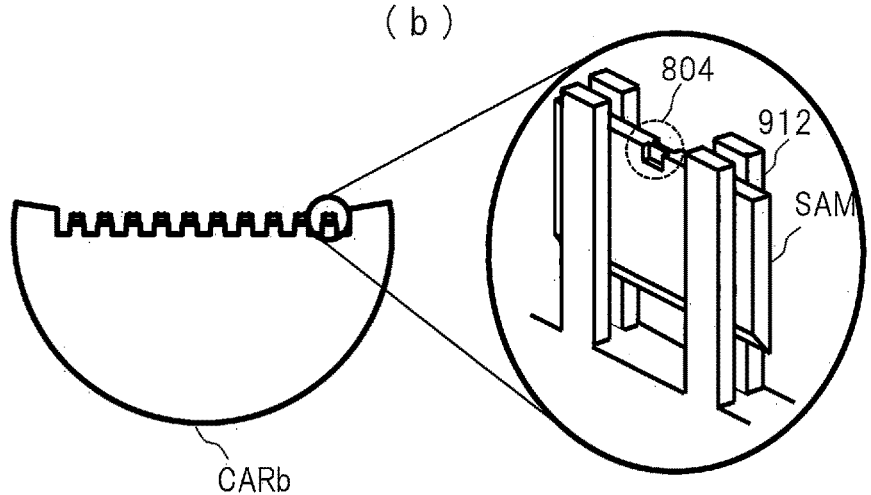
(c)
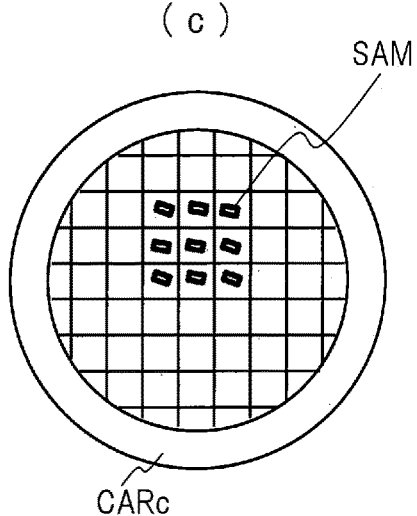

[FIG. 8]
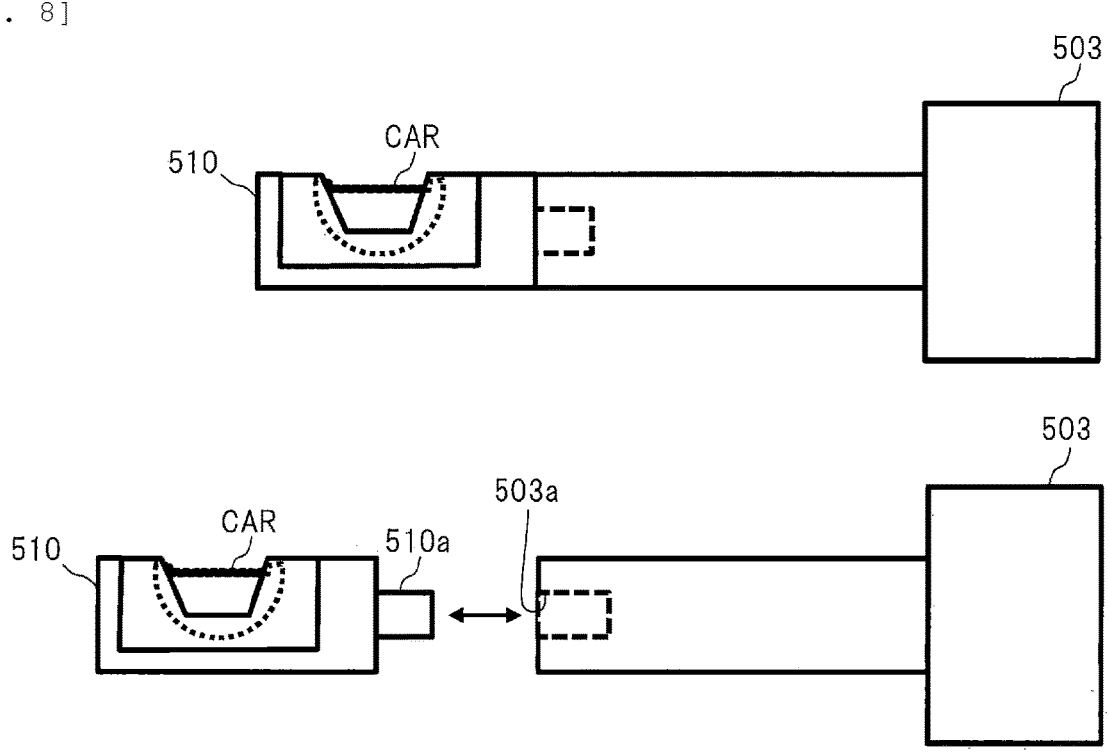

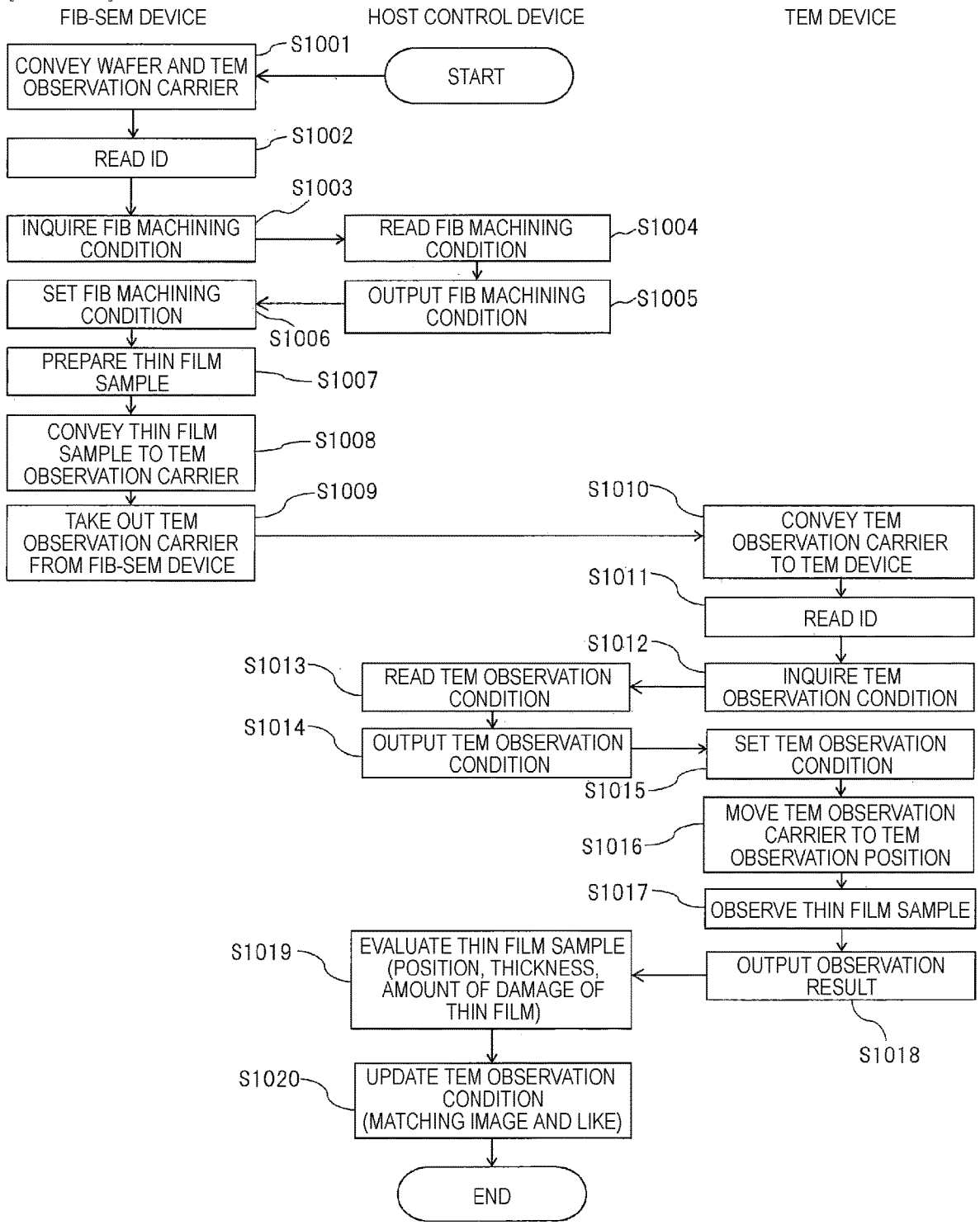

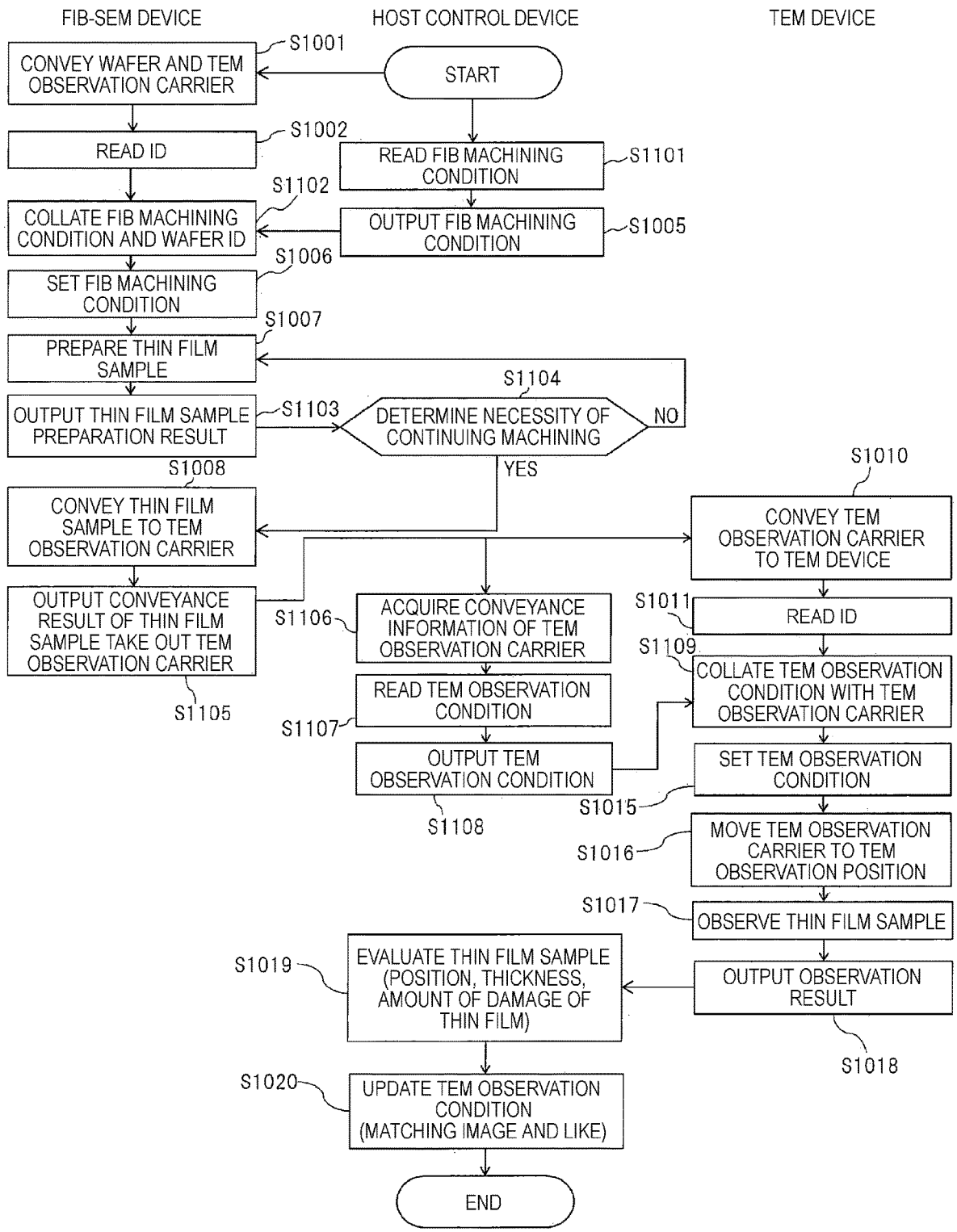
[FIG. 10]

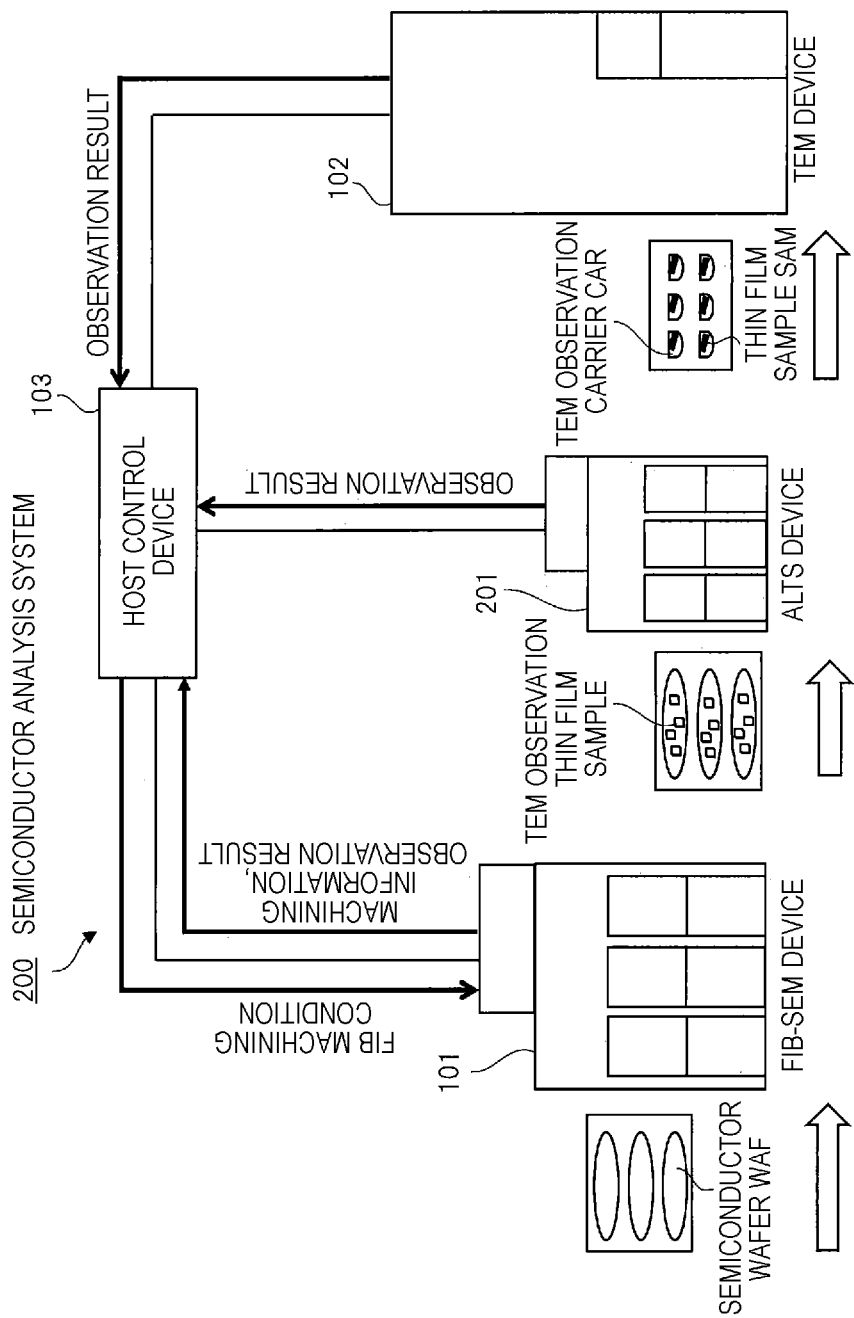
[FIG. 11]

[FIG. 12]
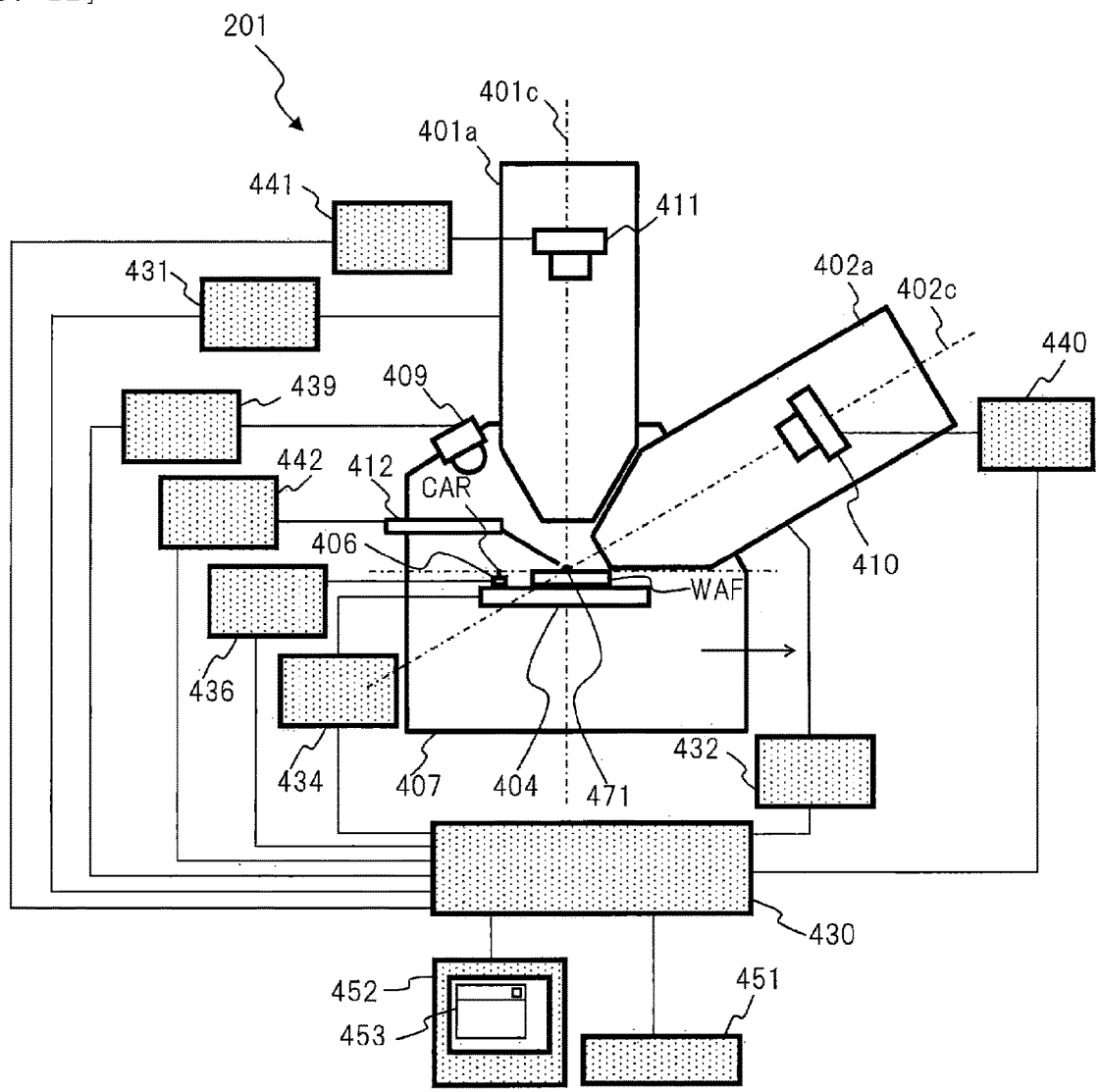

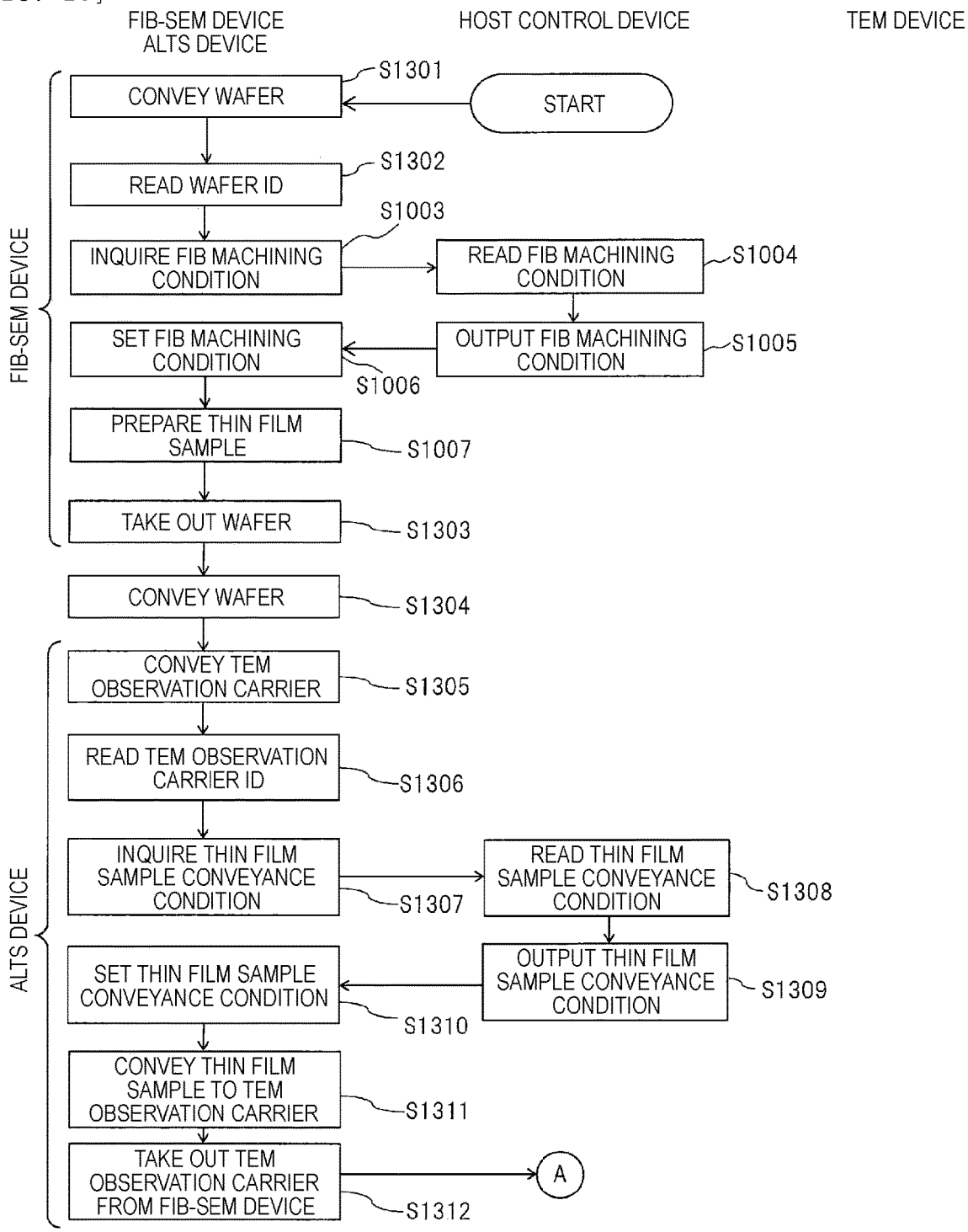
[FIG. 13]

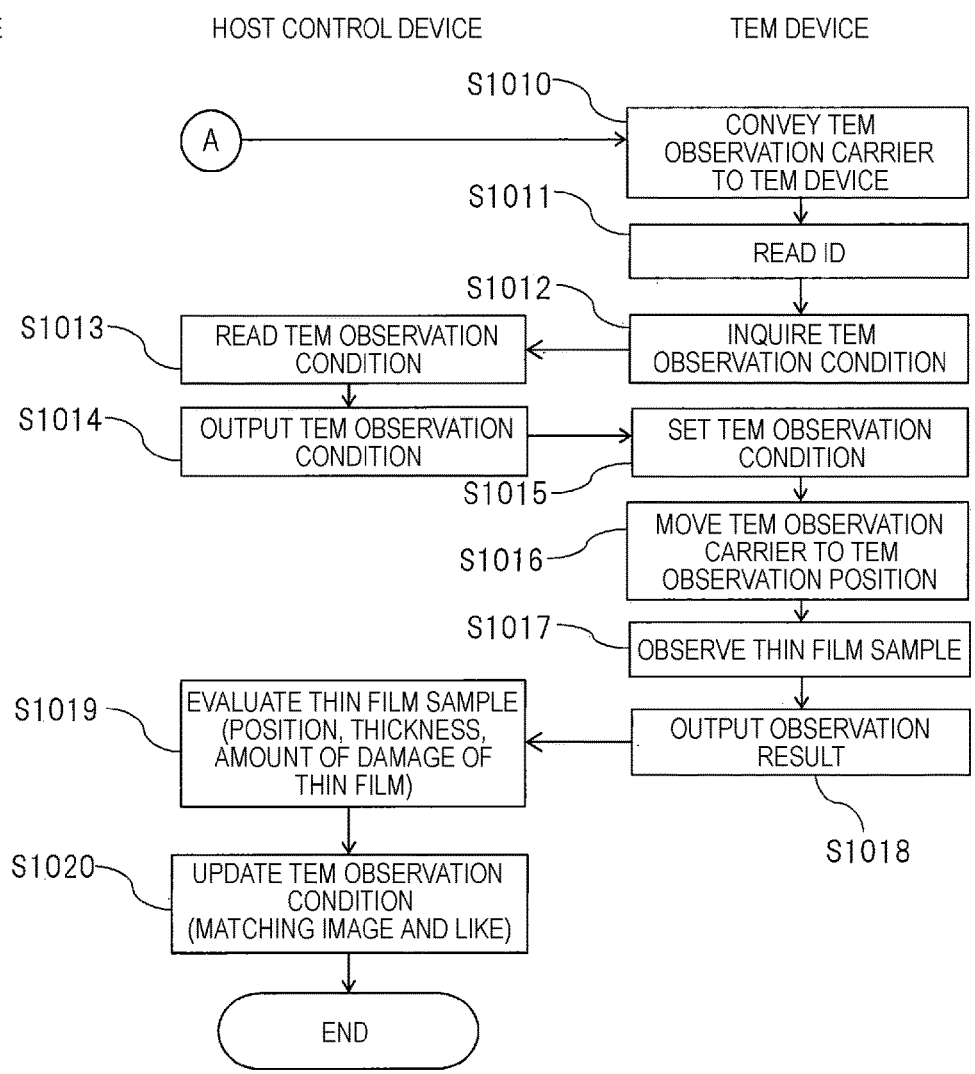
[FIG. 14]

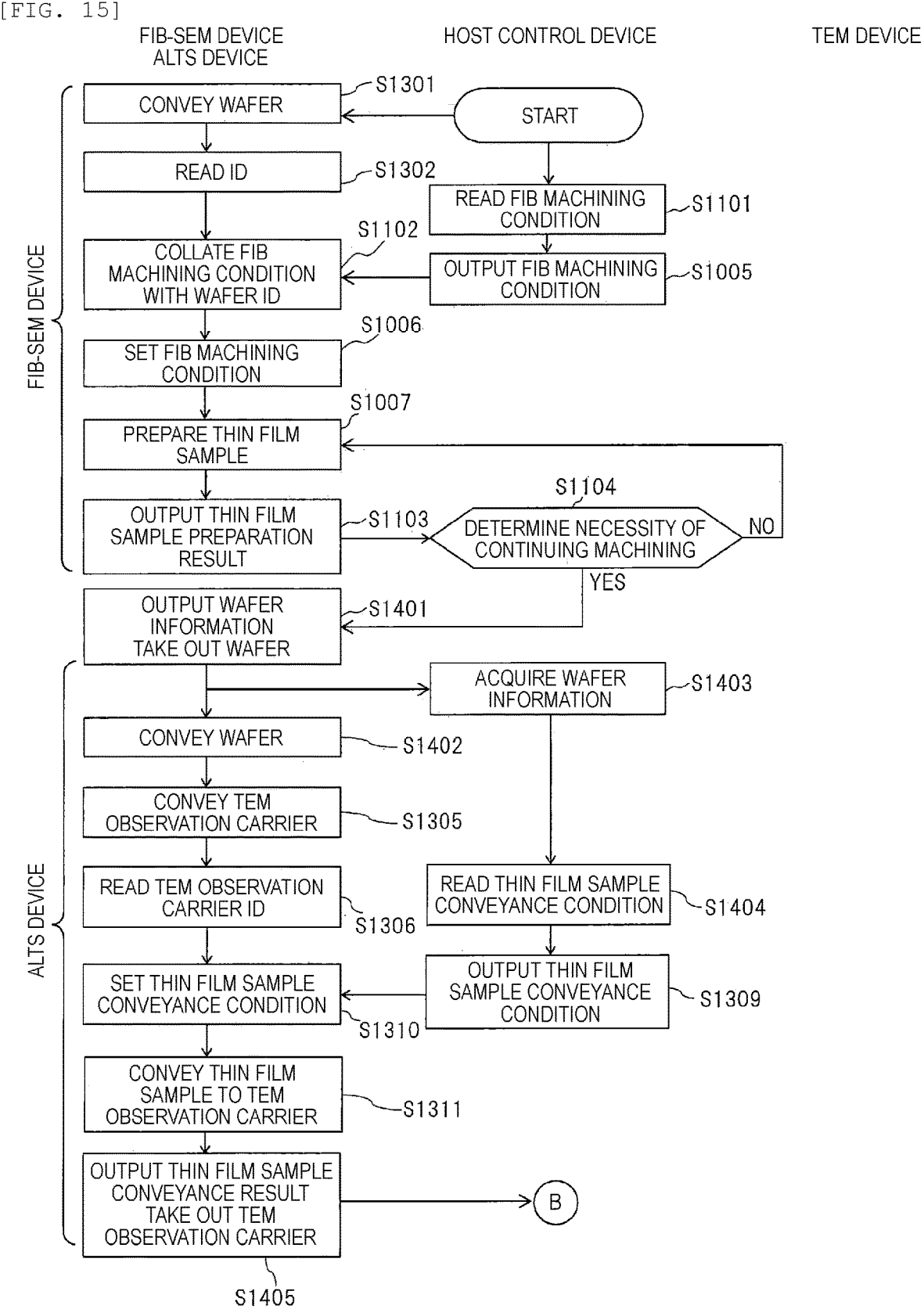

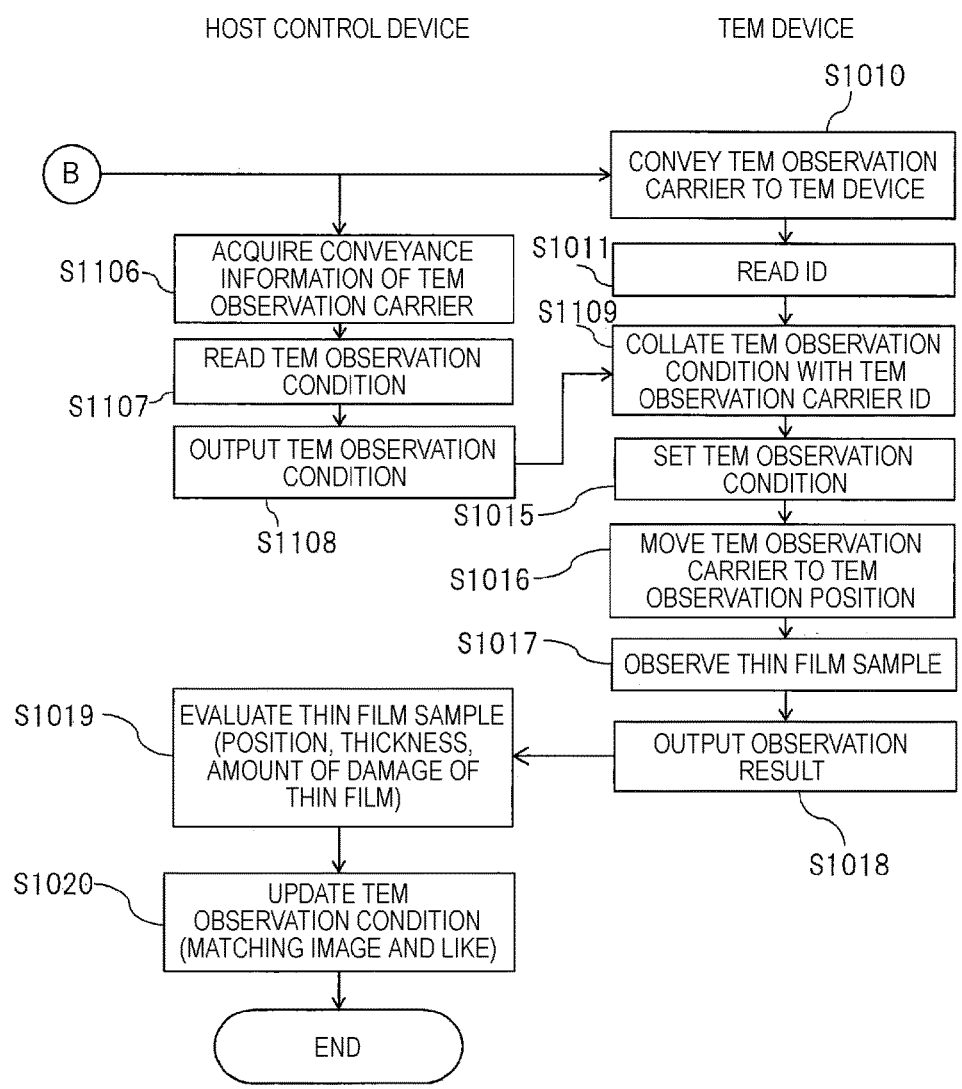
[FIG. 16]

SEMICONDUCTOR ANALYSIS SYSTEM

TECHNICAL FIELD

The present invention relates to a semiconductor analysis system.

BACKGROUND ART

A method for preparing an observation sample of a transmission electron microscope (TEM) by using a FIB-SEM device equipped with a focused ion beam (FIB) and a scanning electron microscope (SEM) is widely known. Specifically, in the FIB-SEM device, a thin film sample for TEM analysis is cut out as an observation sample from a desired area on the semiconductor wafer, and structural analysis and defect analysis of the observation sample are carried out by TEM. Further, by feeding back the result of analysis of the observation sample to the machining conditions, an improvement in the accuracy of preparation of observation sample is achieved.

For example, in JP-A-2009-115582 (PTL 1), there is disclosed a method for improving productivity in the preparation of a sample for the transmission electron microscope, by eliminating a need for use of deposition when fixing a thin sample prepared by machining with a charged particle beam to a sample holder.

CITATION LIST

Patent Literature

PTL 1: JP-A-2009-115582

SUMMARY OF INVENTION

Technical Problem

The need for observing semiconductor devices using an electron microscope is fast increasing. This gives rise to a need for automation of thin film sample preparation for semiconductor wafers by a FIB-SEM device, and automation of thin film sample observation by electron microscope. However, the recent semiconductor devices are continuously miniaturized and with their structures becoming more complex, the required level of automation is increasing year by year.

Therefore, an object of the present invention is to improve the speed and accuracy of automatic TEM observation.

Solution to Problem

The following briefly describes the outline of a representative example of the invention disclosed in the present application.

The semiconductor analysis system according to a representative embodiment of the present invention includes a machining device that machines a semiconductor wafer to prepare a thin film sample for observation, a transmission electron microscope device that acquires a transmission electron microscope image of the thin film sample, and a host control device that controls the machining device and the transmission electron microscope device. The host control device evaluates the thin film sample based on the transmission electron microscope image, updates acquisition conditions of the transmission electron microscope image based on an evaluation result of the thin film sample, and outputs the updated acquisition conditions to the transmission electron microscope device.

Advantageous Effects of Invention

The effect obtained by a representative example of the invention disclosed in the present application will be briefly described as follows.

That is, according to a representative embodiment of the present invention, it is possible to improve the speed and accuracy of automatic TEM observation.

BRIEF DESCRIPTION OF DRAWINGS

FIG. 1 is a schematic configuration diagram showing an example of a semiconductor analysis system according to a first embodiment of the present invention.

FIG. 2 is a schematic configuration diagram showing an example of a FIB-SEM device according to the first embodiment of the present invention.

FIG. 3 is a schematic configuration diagram showing an example of a TEM device according to the first embodiment of the present invention.

FIG. 4 is a schematic configuration diagram showing an example of an electron beam column and its surroundings when used in a TEM mode.

FIG. 5 is a schematic configuration diagram showing an example of an electron beam column and its surroundings when used in a STEM mode.

FIG. 6 is a conceptual diagram of a thin film sample prepared on a semiconductor wafer.

FIG. 7 is a schematic diagram of a thin film sample mounted on a TEM observation carrier.

FIG. 8 is a diagram illustrating a method for retaining the TEM observation carrier in the TEM device.

FIG. 9 is a flow chart showing an example of a semiconductor analysis method according to the first embodiment of the present invention.

FIG. 10 is a flow chart showing an example of the semiconductor analysis method according to a second embodiment of the present invention.

FIG. 11 is a schematic configuration diagram showing an example of a semiconductor analysis system according to a third embodiment of the present invention.

FIG. 12 is a schematic configuration diagram showing an example of an ALTS device of FIG. 11.

FIG. 13 is a flow chart showing an example of a semiconductor analysis method according to the third embodiment of the present invention.

FIG. 14 is a flow chart showing an example of the semiconductor analysis method according to the third embodiment of the present invention.

FIG. 15 is a flow chart showing an example of a semiconductor analysis method according to a fourth embodiment of the present invention.

FIG. 16 is a flow chart showing an example of the semiconductor analysis method according to the fourth embodiment of the present invention.

DESCRIPTION OF EMBODIMENTS

Hereinafter, embodiments of the present invention will be described with reference to the drawings. Each of the embodiments described below is an example for realizing the present invention, and is not to be construed as limiting the technical scope of the present invention. In addition, throughout the embodiments, the members having the same

First Embodiment

<Configuration of Semiconductor Analysis System>

FIG. 1 is a schematic configuration diagram showing an example of a semiconductor analysis system according to a first embodiment of the present invention. A semiconductor analysis system 100 includes a FIB-SEM device (machining device) 101, a TEM device 102, and a host control device 103. Note that, while FIG. 1 shows a configuration having one FIB-SEM device 101 and one TEM device 102, there may be provided a plurality of these, respectively. Here, the SEM refers to the scanning electron microscope. In addition, the TEM refers to the transmission electron microscope, and STEM, which will be described below, refers to the scanning transmission electron microscope.

The FIB-SEM device 101 is a device that includes a FIB device that prepares (cuts out) a thin film sample SAM for observation from a semiconductor wafer WAF, and a SEM device that observes the semiconductor wafer WAF or the prepared thin film sample SAM. Note that, in the present embodiment, the SEM device may not be included.

The TEM device 102 is a device that performs structural analysis and defect analysis of the thin film sample SAM. The TEM device 102 acquires a TEM image (transmission electron microscope image) of the thin film sample SAM by diffraction contrast or phase contrast. In addition, the TEM device 102 may have the structure and function of the STEM device. In this case, the TEM device 102 may acquire a HAADF image as a STEM image (scanning transmission electron microscope image) of the thin film sample SAM. The FIB-SEM device 101 and the TEM device 102 can communicate with each other via the host control device 103.

The host control device 103 is a device that controls the FIB-SEM device 101 and the TEM device 102. The host control device 103 performs basic control such as operation start and stop of the FIB-SEM device 101 and the TEM device 102, output of FIB machining conditions for the semiconductor wafer WAF, output of TEM observation conditions (acquisition conditions for transmission electron microscope image) of the thin film sample SAM prepared by FIB machining, and the like. Further, the host control device 103 performs evaluation of the thin film sample SAM based on the TEM image (STEM image) output from the TEM device 102, update of the TEM observation conditions based on the evaluation result, and the like. The configuration of each device included in the semiconductor analysis system 100 will be described in detail below.

The main processing in the semiconductor analysis system 100 is as follows. In the FIB-SEM device 101, the thin film sample SAM is prepared from the semiconductor wafer WAF conveyed in the device by using the FIB device. The prepared thin film sample SAM is placed on a TEM observation carrier CAR. The TEM observation carrier CAR, with the thin film sample SAM placed thereon, is conveyed from the FIB-SEM device 101 to the TEM device 102, and the TEM device 102 performs structural analysis and defect analysis of the thin film sample SAM.

In the present embodiment, the host control device 103 is described as an independent component, but the FIB-SEM device 101, or the TEM device 102, may be responsible for some or all of the functions of the host control device 103.

Note that the semiconductor wafer WAF may be conveyed with a container that can accommodate a plurality of wafers, or may be conveyed while being placed on a cartridge that can be inserted into the FIB-SEM device 101. Further, the TEM observation carrier CAR may be conveyed with a container that can accommodate a plurality of carriers, or may be conveyed while being placed on a cartridge that can be inserted into the TEM device 102. In addition, some or all of the handling tasks for the semiconductor wafer WAF and the TEM observation carrier CAR may be performed by human or conveyance robot.

<Configuration of FIB-SEM Device>

FIG. 2 is a schematic configuration diagram showing an example of the FIB-SEM device according to the first embodiment of the present invention. As shown in FIG. 2, the FIB-SEM device 101 includes an ion beam column 301a, an ion beam column controller 331 that controls the ion beam column 301a, an electron beam column 302a, an electron beam column controller 332 that controls the electron beam column 302a, a wafer stage 304 on which a semiconductor wafer WAF can be placed, and a wafer stage controller 334 that controls the wafer stage 304.

Further, the FIB-SEM device 101 includes a substage 306 on which a TEM observation carrier CAR can be placed, a substage controller 336 that controls the substage 306, a probe unit 312 for picking up the thin film sample SAM prepared on the semiconductor wafer WAF, a probe unit controller 342 that controls the probe unit 312, and a sample chamber 307.

Further, the FIB-SEM device 101 includes charged particle detectors 309 and 310 that detect charged particles generated when an ion beam 301b or an electron beam 302b is applied to the thin film sample SAM on the semiconductor wafer WAF or the TEM observation carrier CAR, a detector controller 339 that controls the charged particle detector 309, a detector controller 340 that controls the charged particle detector 310, an X-ray detector 311, an X-ray detector controller 341 that controls the X-ray detector 311, and an integrated computer 330 that controls the operations of the entire FIB-SEM device 101. The integrated computer 330 and each controller can communicate with each other.

Further, the FIB-SEM device 101 includes a controller 351 (keyboard, mouse, and the like) for the operator to input various instructions and the like such as irradiation conditions of an ion beam or an electron beam and the position of the wafer stage 304, a GUI screen 353 for controlling the FIB-SEM device 101, one or a plurality of displays 352 and the like that display the state of the FIB-SEM device 101, various acquired information and the like including images, and the like. The state of the FIB-SEM device 101, the acquired information, and the like may be included in the GUI screen 353.

The ion beam column 301a is a system that includes all the components necessary for FIB, such as an ion source for generating an ion beam, a lens for focusing the ion beam, a deflection system for scanning and shifting the ion beam, a blanking deflection system for blanking the ion beam, and the like.

The electron beam column 302a is a system that includes all the components necessary for SEM, such as an electron source for generating an electron beam, a lens for focusing the electron beam, a deflection system for scanning and shifting the electron beam, a blanking deflection system for blanking the electron beam, and the like.

The ion beam column 301a and the electron beam column 302a are mounted on the sample chamber 307. The ion beam 301b passed through the ion beam column 301a and the electron beam 302*b* passed through the electron beam column 302*a* are mainly focused on the intersection (cross point 371) of an optical axis 301*c* of the ion beam column 301*a* and an optical axis 302*c* of the electron beam column 302*a*.

While gallium ions are generally used for the ion beam 301*b*, specific ion types for the purpose of machining do not matter herein. Further, the ion beam 301*b* is not limited to the focused ion beam, and may be a broad ion beam provided with a mask.

In the present embodiment, the ion beam column 301*a* is arranged vertically and the electron beam column 302*a* is arranged in an inclined manner, but embodiments are not limited to such an arrangement. For example, the ion beam column 301*a* may be arranged in an inclined manner, and the electron beam column 302*a* may be arranged vertically. Further, the ion beam column 301*a* and the electron beam column 302*a* may be arranged in an inclined manner.

The FIB-SEM device 101 according to the present embodiment may have a triple column configuration including a gallium focused ion beam column, an argon focused ion beam column, and an electron beam column.

Further, a device combining the FIB device with an observation system such as an optical microscope or an AFM instead of the electron beam column may be used in place of the FIB-SEM device 101. Alternatively, machining and observation may be performed using only the ion beam column. In this case, the number of columns for generating a beam can be reduced, and the device cost can be reduced.

The wafer stage 304 and the substage 306 can move in a plane or rotationally under the control of the corresponding wafer stage controller 334 and the substage controller 336. Further, the wafer stage 304 and the substage 306 move a predetermined position in the semiconductor wafer WAF or the thin film sample SAM required for machining by the ion beam or observation to the ion beam irradiation position or to the observation position by the electron beam.

The probe unit 312 picks up the thin film sample SAM prepared on the semiconductor wafer WAF. When picking up the thin film sample SAM, the probe unit 312 may use tweezers (not shown) instead of the probe. Further, the probe unit 312 may come into contact with a surface of the semiconductor wafer WAF to supply the potential to the semiconductor wafer.

The detector controllers 339 and 340 are functional blocks that arithmetically process and image the detection signals output from the corresponding charged particle detectors 309 and 310, and include an arithmetic processing unit that is implemented in the processor by executing a predetermined circuit or program.

The charged particle detectors 309 and 310 may include a composite charged particle detector capable of detecting electrons and ions.

In addition to the elements described above, a gas injection unit (not shown) and the like are mounted in the sample chamber 307. Further, the FIB-SEM device 101 has each controller (not shown) that controls the gas injection unit and the like. The gas injection unit stores deposition gas for forming a deposit film on the semiconductor wafer WAF or the thin film sample SAM by irradiation with a charged particle beam, and supplies it into the sample chamber 307 from a nozzle tip (not shown) as needed. As a result, a protective film or marking can be prepared at any position on the semiconductor wafer WAF, the thin film sample SAM, and the TEM observation carrier CAR.

Further, the sample chamber 307 may store an etching gas that is chemically corroded or etched by irradiation with the charged particle beam. This etching gas may be used for machining the semiconductor wafer WAF.

Further, the sample chamber 307 may be equipped with a cold trap, an optical microscope, or the like. Further, in the sample chamber 307, a detector such as a tertiary electron detector, a STEM detector, a backscattering electron detector, a low energy loss electron detector, or the like may be provided in addition to the charged particle detector 309. Further, the sample chamber 307 may be equipped with a mass spectrometer or the like, in addition to the X-ray detector 311.

<Configuration of TEM Device>

FIG. 3 is a schematic configuration diagram showing an example of the TEM device according to the first embodiment of the present invention. The TEM device 102 of FIG. 3 can be used in a TEM mode, or can be used in a STEM mode by switching the mode.

As shown in FIG. 3, the TEM device 102 includes an electron beam column 501, an electron beam column controller 521 that controls the electron beam column 501, a sample holder 503 on which a TEM observation carrier CAR is placed, a sample holder stage 504 that drives the sample holder 503, and a holder stage controller 524 that controls the sample holder stage 504.

Further, the TEM device 102 includes a secondary electron detector 505 that detects electrons emitted from the thin film sample SAM, a detector controller 525 that controls the secondary electron detector 505, a fluorescent plate 506 that projects a transmission electron microscope image, a camera 507 that captures an image of the fluorescent plate 506, a camera controller 527 that controls the camera 507, an X-ray detector 508 that detects X-rays emitted from the thin film sample SAM, an X-ray detector controller 528 that controls the X-ray detector 508, and an integrated computer 530 that controls the overall operations of the TEM device 102. The integrated computer 530 and each controller can communicate with each other.

Further, the TEM device 102 includes a controller 531 (keyboard, mouse, and the like) for inputting various instructions such as irradiation conditions, the position of the holder stage 504, and the like, a GUI screen 533 for controlling the TEM device 102, and one or a plurality of displays 532 and the like that display the state of the TEM device 102, various acquired acquisition information including images, and the like. The state of the TEM device 102, the acquired information, and the like may be included in the GUI screen 533.

FIG. 4 is a schematic configuration diagram showing an example of the electron beam column and its surroundings when used in the TEM mode. As shown in FIG. 4, the electron beam column 501 includes an electron source 601 for generating an electron beam, an irradiation lens group 602 for irradiating the thin film sample SAM with the electron beam, an objective lens 603, a projection lens group 604 that projects the electron beam that has passed through the thin film sample SAM, and the like. Further, below the electron beam column 501, an electron energy loss spectroscope (EELS) 609, a detector 610 for the EELS, and the like are arranged.

As described above, all the elements necessary for analysis using the TEM device 102 are mounted on the electron beam column 501 and its surroundings. As shown in FIG. 6, in the TEM mode, the electron beam is spread over the entire observation area on the thin film sample SAM and is irradiated thereon, and sample information is acquired from a projected image, an interference image, a diffraction pattern, or the like.

FIG. 5 is a schematic configuration diagram showing an example of the electron beam column and its surroundings when used in the STEM mode. As shown in FIG. 5, the electron beam column 501 in the STEM mode has a configuration in which a deflection system 605 for scanning and shifting the electron beam and a diaphragm 611 for controlling the opening angle of the electron beam are added to each of the main elements of FIG. 4. Further, instead of the fluorescent plate 506 of FIG. 4, an annular detector 606 for detecting transmitted electrons scattered at a wide angle, and a transmitted electron detector 607 for detecting electrons transmitted through the thin film sample SAM are provided. As shown in FIG. 7, in the STEM mode, the electron beam is focused on the thin film sample SAM and scans the observation area to acquire the sample information.

In the TEM mode and the STEM mode, a cold trap may be disposed in the vicinity of the thin film sample SAM, or the sample holder 503 may be provided with a cooling mechanism, a heating mechanism, a gas introduction mechanism, and the like.

<Configuration of Host Control Device>

As shown in FIG. 1, the host control device 103 includes a memory 103a, a position detection unit 103b that detects the position of the thin film machining area where the thin film sample SAM is prepared, a thickness detection unit 103c that detects the thickness of the thin film sample SAM, a damage amount detection unit 103d that detects the amount of damage due to the preparation of the thin film sample SAM, an machining end determination unit 103f, and an observation result determination unit 103f.

The memory 103a is a storage device including a non-volatile memory, a hard disk, or the like. The memory 103a stores the FIB machining conditions corresponding to the IDs assigned to the semiconductor wafer WAF and the TEM observation carrier CAR to be described below. For example, the FIB machining conditions include acceleration voltage of the ion beam, beam current, machining area on the semiconductor wafer WAF, sequence of machining, and the like.

Further, the memory 103a stores the TEM observation conditions corresponding to each ID. The TEM observation conditions include a plurality of items. In the case of the TEM mode, the TEM observation conditions include an observation mode (TEM image observation, diffraction pattern observation, energy dispersive X-ray analysis (EDX analysis), electron energy loss spectroscopy analysis (EELS analysis), and the like), a TEM magnification, a camera length, a probe current amount (the size of the aperture diameter of the irradiation system), and the like, for example. In the case of STEM mode, the STEM observation conditions include an observation magnification, a probe diameter (reduction rate of the optical system), an irradiation angle to the sample, selection of the detector (transmission electron detector, annular detector, secondary electron detector, and the like), a capture angle of the detector, and the like, for example.

The position detection unit 103b, the thickness detection unit 103c, the damage amount detection unit 103d, the machining end determination unit 103f, and the observation result determination unit 103g may be configured by hardware, or may be implemented on a processor by executing software, or may be configured by combining hardware and software. The position detection unit 103b, the thickness detection unit 103c, the damage amount detection unit 103d, the machining end determination unit 103f, and the observation result determination unit 103g will be described below.

<Configuration of Thin Film Sample and TEM Observation Carrier>

FIG. 6 is a conceptual diagram of a thin film sample prepared on a semiconductor wafer. In the FIB-SEM device 101, one or a plurality of thin film samples SAM are prepared on the semiconductor wafer WAF. In the present embodiment, the thin film sample SAM is connected to the semiconductor wafer WAF by one support portion 803, but the number of support portions 803 may be two or more.

In either case, when the thin film sample SAM is picked up, the support portion 803 is cut from the semiconductor wafer WAF. Cutting the support portion 803 may be performed by the FIB and may be performed by division using tweezers or the like. Further, although a TEM observation area 804 is made thinner than its surroundings, it does not necessarily have to be thinner than the surroundings as long as it has a thickness that allows TEM observation.

The size of the semiconductor wafer WAF is generally 100 mm to 300 mm, the size of the thin film sample SAM is several μm to several tens of μm, the thickness of the thin film sample SAM is several μm, and the thickness of the TEM observation area 804 is several nm to several tens of nm.

FIG. 7 is a schematic view of a thin film sample mounted on the TEM observation carrier. (a) of FIG. 7 shows an example of the thin film sample SAM when it is supported by a TEM observation carrier CARa (CAR) having a pillar 911. The thin film sample SAM and the pillar 911 are fixed by using deposition gas, for example. (a) of FIG. 7 shows a case in which one thin film sample SAM is supported by one pillar 911, but a plurality of thin film samples SAM may be supported by one pillar 911.

(b) of FIG. 7 shows an example of the thin film sample SAM when it is gripped by a TEM observation carrier CARb (CAR) having a clip shape. In (b) of FIG. 7, both ends of the thin film sample SAM are gripped by a clip 912 including a plurality of pillars, but the thin film sample SAM may be gripped by only one end. Further, the clip 912 may grip a plurality of thin film samples SAM stacked in the vertical direction.

(c) of FIG. 7 shows an example of the thin film sample SAM when it is supported by a TEM observation carrier CARc configured in a grid pattern. Specifically, a film such as a carbon film, a polymer film, or the like having a lamellar structure, for example, is stretched on the TEM observation carrier CARc, and one or a plurality of thin film samples SAM are supported on the film. This film does not have to be a uniform film, and may be a film having a large number of pores. Further, a plurality of thin film samples may be supported by one grid.

FIG. 8 is a diagram illustrating a method for retaining the TEM observation carrier in the TEM device. In the TEM device 102, the TEM observation carrier CAR is held in the cartridge 510. The cartridge 510 is provided with a protrusion 510a, and the cartridge 510 is fixed to the sample holder 503 by inserting the protrusion 510a into a hole 503a of the sample holder 503. Then, with the sample holder 503 and the cartridge 510 attached thereto being set on the electron beam column 501, the TEM observation of the thin film sample SAM is performed.

<Semiconductor Analysis Method>

Next, a semiconductor analysis method using the semiconductor analysis system 100 will be described. FIG. 9 is a flow chart showing an example of the semiconductor analysis method according to the first embodiment of the present invention. In FIG. 9, each process corresponding to the FIB-SEM device 101, the host control device 103, and the TEM device 102 is shown.

The semiconductor analysis process is started by transmitting an instruction from the host control device 103 to the FIB-SEM device 101 and the TEM device 102. When the semiconductor analysis process is started, first, the semiconductor wafer WAF and the TEM observation carrier CAR are conveyed into the FIB-SEM device 101 (step S1001).

Then, the FIB-SEM device 101 reads an ID of the conveyed semiconductor wafer WAF and an ID of the conveyed TEM observation carrier CAR (step S1002). The IDs include a barcode, a two-dimensional code, and the like, for example. The IDs are formed on a part of the semiconductor wafer WAF or the TEM observation carrier CAR by laser machining or the like. Then, the FIB-SEM device 101 outputs the read ID to inquire the corresponding FIB machining condition to the host control device 103 (step S1003).

The host control device 103 reads the FIB machining conditions from the memory 103*a* based on the ID output from the FIB-SEM device 101 (step S1004), and outputs the read FIB machining conditions to the FIB-SEM device 101 (step S1005).

The FIB-SEM device 101 sets thin film sample preparation conditions based on the FIB machining conditions output from the host control device (step S1006), and prepares the thin film sample SAM according to the set thin film sample preparation conditions (step S1007).

After preparing the thin film sample SAM, the FIB-SEM device 101 picks up the thin film sample SAM and conveys it to the TEM observation carrier CAR (step S1008). For the pickup of the thin film sample SAM, for example, the probe unit 312 or tweezers may be used.

Then, the TEM observation carrier CAR is taken out from the FIB-SEM device 101 (step S1009). The TEM observation carrier CAR may be taken out in a state of being stored in a dedicated case in the FIB-SEM device 101, or may be taken out in a state of being placed on a cartridge that can be attached to the TEM device 102.

The TEM observation carrier CAR taken out from the FIB-SEM device 101 is conveyed to the TEM device 102 (step S1010). Note that some or all of conveyance tasks of the TEM observation carrier CAR may be performed by human or robot.

Next, the TEM device 102 reads the ID of the conveyed TEM observation carrier CAR (step S1011). Then, the TEM device 102 outputs the read ID to inquire the corresponding TEM observation condition to the host control device 103 (step S1012).

The host control device 103 reads the TEM observation condition from the memory 103*a* based on the ID output from the TEM device 102 (step S1013), and outputs the read TEM observation condition to the TEM device 102 (step S1014).

The TEM device 102 sets the observation conditions of the thin film sample SAM based on the TEM observation conditions output from the host control device 103 (step S1015), and moves the TEM observation carrier CAR to a predetermined observation position (step S1016). Then, the TEM device 102 observes the thin film sample SAM under the set observation conditions (step S1017). Note that steps S1015 and S1016 may be processed with the processing sequences reversed, or may be performed in parallel. The TEM device 102 outputs the observation result of the thin film sample SAM to the host control device 103 (step S1018). The observation results include TEM images, detection data in each detector, and the like.

<<Evaluation of Thin Film Sample>>

The observation result determination unit 103*g* of the host control device 103 evaluates the thin film sample SAM based on an observation result output from the TEM device 102 (step S1019). Hereinafter, a method for measuring the thin film sample SAM will be described in detail. For example, the evaluation items for the thin film sample SAM include an amount of misalignment of the thin film machining area, an amount of thickness deviation of the film thickness, an amount of damage due to FIB machining, and the like.

First, the evaluation of the amount of misalignment of the thin film machining area will be described. To measure the position of the thin film machining area, CAD data or 3D reconstruction data of the observation area is prepared, and based on the CAD data or the 3D reconstruction data, the shapes of the thin film sample SAM at a plurality of locations in the observation area are prepared in advance as reference images. In addition, the 3D reconstruction data may be prepared by using electron tomography method of the TEM image, or may be prepared by repeating FIB machining and SEM observation.

The position detection unit 103*b* of the host control device 103 matches the TEM image or STEM image (observation result) output from the TEM device 102 with each of the plurality of reference images, and specifies a reference image that has the highest correlation value to detect the position of the thin film machining area (the position where the thin film sample SAM is prepared). In addition, the image matching algorithm may be a method for emphasizing edges, a method for extracting feature points, or a method of using shape information. Then, the position detection unit 103*b* compares the detected position of the thin film machining area with a set position of the thin film machining area, and calculates the amount of misalignment of the thin film machining area as the evaluation result based on.

Next, the evaluation of the amount of thickness deviation of the film thickness of the thin film sample SAM will be described. When the thickness of the film thickness of the thin film sample SAM is thick, since structures behind the structure to be observed also appear in the TEM image or STEM image at the same time, the thickness detection unit 103*c* of the host control device 103 can count the number of structures in the TEM image or STEM image output from the TEM device 102 to calculate the film thickness of the thin film sample SAM. It is possible that the structures may overlap, but by inclining the thin film sample SAM, such overlap can be eliminated and the film thickness of the thin film sample SAM can be detected.

Further, when an HAADF-STEM image is used, the contrast of the HAADF-STEM image depends on the film thickness of the thin film sample SAM and the constituent atoms of the thin film sample SAM, in which the constituent atoms to be observed are almost the same in the thin film sample SAM. Therefore, the thickness detection unit 103*c* can calculate signal strength of the HAADF-STEM image to detect the film thickness of the thin film sample SAM.

For example, the relationship between the film thickness and the signal strength is measured or calculated in advance, and film thickness-signal strength information including the film thickness associated with the signal strength is stored in the memory 103*a* as a table, a function, or the like. Then, the thickness detection unit 103*c* detects the film thickness of the thin film sample SAM corresponding to the calculated signal strength based on the film thickness-signal strength information. Then, the thickness detection unit 103*c* compares the detected film thickness of the thin film sample SAM with a set film thickness, and calculates the amount of thickness deviation of the film thickness as the evaluation result.

Next, the evaluation of the amount of damage due to FIB machining will be described. When the FIB machining is performed, a damage layer is formed at an end of the thin film sample SAM such that the crystalline portion becomes amorphous. Observation of the Fast Fourier Transform (FFT) pattern of the TEM image or STEM image reveals that the crystal portion generally becomes a spot and the amorphous portion becomes a circular pattern. Therefore, the damage layer can be evaluated to be smaller as the strength of the circular pattern is weaker, and evaluated to be larger as the strength of the circular pattern is stronger.

Therefore, for example, the relationship between the strength of the circular pattern and the thickness of the damage layer in the FFT pattern of the TEM image or the STEM image is measured or calculated in advance, and circular pattern strength-damage layer information including the strength of the circular pattern associated with the thickness of the damage layer is stored in the memory 103*a* as a table, a function, or the like. Further, the memory 103*a* stores damage layer thickness-damage amount information including the thickness of the damage layer associated with the amount of damage.

The damage amount detection unit 103*d* calculates the thickness of the damage layer from the calculated circular pattern strength based on the circular pattern strength-damage layer information. Then, the damage amount detection unit 103*d* calculates the amount of damage from the calculated thickness of the damage layer based on the damage layer thickness-damage amount information.

In addition, the memory 103*a* may store pattern strength-damage amount information including the strength of the circular pattern associated with the amount of damage. In this case, the damage amount detection unit 103*d* can directly calculate the amount of damage from the strength of the circular pattern based on the pattern strength-damage amount information.

<<Update of TEM Observation Conditions>>

Next, step S1020 will be described. At step S1020, the TEM observation conditions for the subsequent thin film sample SAM are updated based on the evaluation result at step S1019.

For example, when the evaluation result indicating that the thin film machining area is deviated is obtained, it is considered that the preparation position of the thin film sample SAM in the semiconductor wafer WAF is deviated. Further, it is assumed that there is also a similar misalignment in other thin film samples SAM prepared under the same machining conditions. In this case, the host control device 103 updates the TEM observation conditions by changing a matching image used for specifying the TEM observation position, offsetting the observation position according to the amount of misalignment, and the like.

Further, the host control device 103 also updates the TEM observation conditions with respect to amount of thickness deviation and amount of damage of the thin film sample SAM, by changing the matching image based on the evaluation result, or the like.

<Other Configurations>

The host control device 103 may generate a learning model for TEM observation by associating the TEM image of the thin film sample SAM with the TEM observation result using the TEM image. This learning model reflects the results obtained by comparing the cases where the TEM observation is successful and the cases where the TEM observation is unsuccessful with the respective TEM images. The host control device 103 can use the learning model to determine whether or not to update the TEM observation conditions based on the acquired TEM image. Further, the host control device 103 can also use the learning model to calculate a specific value for the update of the TEM observation condition. As a result, it is possible to improve the success rate of TEM observation for the subsequent thin film samples SAM.

Further, focus value or the like updated by an autofocus adjustment can be commonly used for other thin film samples SAM placed on the same TEM observation carrier CAR. In this case, it is possible to improve the success rate of TEM observation for the subsequent thin film samples SAM in a short time.

In addition, even when it is determined that updates of the TEM observation conditions would not be necessary, it is desirable that the host control device 103 records in the memory 103*a* that the TEM observation conditions are not updated. This record can be used as information indicating the reliability of the registered TEM observation conditions.

<Main Effects of Present Embodiment>

According to the present embodiment, the host control device 103 evaluates the thin film sample SAM based on the TEM image, and updates the machining conditions based on the evaluation result of the thin film sample SAM. According to this configuration, since the observation result of the thin film sample SAM by the TEM device 102 can be fed back to the TEM device 102 to change the TEM observation conditions, change the FIB machining conditions, it is possible to improve the speed and accuracy of automatic TEM observation on the subsequent thin film sample SAM.

When the preparation position of the thin film sample SAM is deviated, it takes time to search for the observation area. Further, it is assumed that the same deviation occurs in other thin film samples SAM prepared on the same semiconductor wafer WAF. In this case, by feeding back the amount of misalignment detected in the preceding thin film sample SAM to the TEM observation of the subsequent thin film sample SAM, it is possible to shorten the time for searching for the observation area.

Further, when the preparation position of the thin film sample SAM deviates greatly from the set position, it is also conceivable that the TEM observation has not ended normally (the automatic observation is not successful). Even in this case, when the TEM image includes an area desired to be observed by the user, desired data can be acquired according to determination of the user. Further, by having the host control device 103 learn the result determined by the user as training data, the TEM observation in the subsequent thin film samples SAM can be normally completed, and the labor of the user can be reduced.

Further, by feeding back the conditions such as the focus value and the like from the preceding thin film sample SAM for the TEM observation of the subsequent thin film sample SAM, the speed of TEM observation can be improved.

Further, according to the present embodiment, the host control device 103 detects the position of the thin film machining area in the thin film sample SAM from the TEM image, compares the detected position of the thin film machining area with the set position of the thin film machining area, and calculates the amount of misalignment of the detected position with respect to the set position as the evaluation result of the thin film sample. According to this configuration, it is possible to appropriately update the TEM observation conditions based on the evaluation result.

Further, according to the present embodiment, the host control device 103 offsets the observation position of the thin film sample SAM in the TEM device 102 according to the amount of misalignment of the thin film machining area. According to this configuration, it is possible to correct the observation position of the thin film sample SAM to an appropriate position.

Further, according to the present embodiment, the host control device 103 detects the film thickness of the thin film sample SAM from the TEM image, compares the detected film thickness of the thin film sample SAM with the set film thickness, and calculates the amount of thickness deviation of the detected film thickness with respect to the set film thickness as the evaluation result. According to this configuration, it is possible to appropriately update the TEM observation conditions based on the evaluation result.

Further, according to the present embodiment, the host control device 103 calculates the amount of damage of the thin film sample SAM due to machining from the TEM image as the evaluation result. According to this configuration, it is possible to appropriately update the TEM observation conditions based on the evaluation result.

Further, according to the present embodiment, the host control device 103 updates the acquisition condition of the transmission electron microscope image by changing a matching image used for specifying the observation position in the TEM device 102. According to this configuration, it is possible to appropriately update the TEM observation conditions based on the evaluation result.

Further, according to the present embodiment, the TEM device 102 acquires a STEM image. According to this configuration, an image that cannot be acquired by the TEM image can be obtained, and it is possible to make a more accurate evaluation of the thin film sample SAM.

Second Embodiment

Next, the second embodiment will be described. Note that, basically, the descriptions of the elements overlapping with those in the embodiments described above will be omitted. In the present embodiment, it is assumed that the semiconductor wafer WAF conveyed to the FIB-SEM device 101 is specified by the host control device 103. Therefore, in the present embodiment, part of the flow of the semiconductor analysis method is different from that of the first embodiment.

FIG. 10 is a flow chart showing an example of the semiconductor analysis method according to the second embodiment of the present invention. When the semiconductor analysis process is started, steps S1001 and S1101 are executed in parallel.

At step S1002, the FIB-SEM device 101 reads an ID of the semiconductor wafer WAF and an ID of the TEM observation carrier CAR. Meanwhile, in the present embodiment, it is assumed that the semiconductor wafer WAF conveyed to the FIB-SEM device 101 is specified by the host control device 103. Therefore, it is not essential to read the ID of the semiconductor wafer WAF. Further, regarding the ID of the TEM observation carrier CAR, when the host control device 103 can manage the TEM observation carrier CAR, it is also not essential to read the ID of the TEM observation carrier CAR. In this case, the TEM observation carrier CAR that does not have an ID can also be used.

At step S1101, the host control device 103 reads a FIB machining condition suitable for the semiconductor wafer WAF conveyed to the FIB-SEM device 101, among the FIB machining conditions stored in the memory 103a. As described above, since the semiconductor wafer WAF conveyed to the FIB-SEM device 101 is specified in the host control device 103, the host control device 103 reads the FIB machining condition corresponding to the ID of the semiconductor wafer WAF to be machined from the memory 103a. Then, the host control device 103 outputs the read FIB machining condition to the FIB-SEM device 101 (step S1005). At this time, the host control device 103 may output the ID of the corresponding semiconductor wafer WAF together with the FIB machining condition.

At step S1102, the FIB-SEM device 101 collates the FIB machining condition output from the host control device 103 with the ID of the semiconductor wafer. However, since the host control device 103 specifies the semiconductor wafer WAF conveyed to the FIB-SEM device 101, this step can be omitted as appropriate.

Steps S1006 and S1007 are the same as those in the first embodiment. After step S1007, step S1103 is executed.

At step S1103, the FIB-SEM device 101 outputs a thin film sample preparation result for the semiconductor wafer WAF to the host control device 103. For example, the thin film sample preparation result may be an SEM image, a change in strength of an electric signal at a specific position, or the like. The change in strength of the electric signal may be a signal varying according to the film thickness of the thin film sample SAM, or it may be a change in strength due to repeated exposure and disappearance of a constituent structure of the thin film sample SAM.

At step S1104, the machining end determination unit 103f of the host control device 103 performs machining continuation necessity determination on whether to continue the thin film sample preparation or to end the thin film sample preparation, based on the thin film sample preparation result output from the FIB-SEM device 101.

For this machining continuation necessity determination, for example, an image matching method or the like is used. The image matching method determines the need for continuation of machining based on, for example, whether or not the FIB machined cross section of the thin film sample SAM matches the reference image prepared in advance. For example, this reference image is an image showing the cross-sectional shape of the thin film sample SAM when the FIB machining is completed.

When the SEM image of the FIB machined cross section and the reference image do not match with each other (NO), it is determined that the FIB machining is not completed. Then, the process returns to step S1007 and the FIB machining is continued. On the other hand, when the SEM image of the FIB machined cross section and the reference image match with each other (YES), it is determined that the FIB machining is completed, and step S1008 is executed.

The host control device 103 may store a group of a series of images of the FIB machined cross section until the FIB machining is completed, and may use the group of the series of images as a reference image for the machining continuation necessity determination. As a result, it is possible to improve the accuracy of the machining continuation necessity determination.

Further, the reference image used for the machining continuation necessity determination may be stored in the host control device 103, and this reference image may be used for various processes during TEM observation.

At step S1105, the FIB-SEM device 101 outputs a conveyance result of the thin film sample SAM to the TEM observation carrier CAR, to the host control device 103. Then, the TEM observation carrier CAR with the thin film sample SAM placed thereon is taken out from the FIB-SEM device 101. In addition, outputting the conveyance result of the thin film sample SAM, and conveying the TEM observation carrier CAR do not have to be performed at the same time.

The conveyance result of the thin film sample SAM may include the ID of the TEM observation carrier CAR with the thin film sample SAM placed thereon, or it may include the SEM image after the conveyance of the thin film sample. Further, when the TEM observation carrier CAR is conveyed to the TEM device 102 after being placed on a predetermined case or the cartridge 510 attachable to the TEM device 102, an optical microscope image after the placement on the case or the cartridge 510 may be included in the conveyance result of the thin film sample SAM. Further, transmission of various information between the FIB-SEM device 101 and the host control device 103 may be performed automatically or manually using a network, or may be performed via a storage medium.

After step S1105, steps S1106 and S1010 are executed in parallel. At step S1106, the host control device 103 acquires conveyance information of the TEM observation carrier CAR from the FIB-SEM device 101. For example, the conveyance information may be the ID of the TEM observation carrier CAR, the ID of the semiconductor wafer WAF corresponding to the thin film sample SAM placed on the TEM observation carrier CAR, or the like.

Then, the host control device 103 reads TEM observation conditions suitable for TEM observation of the thin film sample SAM based on the conveyance information of the observation carrier CAR (step S1107), and outputs the read TEM observation conditions to the TEM device 102 (step S1108). The TEM observation condition may include not only the observation condition read from the host control device 103, but also the information generated based on the conveyance information of the TEM observation carrier CAR output from the FIB-SEM device 101. For example, this information includes a position at which the thin film sample SAM is placed in the TEM observation carrier CAR, and the like.

After steps S1011 and S1108, step S1109 is executed. At step S1109, the TEM device 102 collates the TEM observation conditions with the ID of the TEM observation carrier CAR. However, this step is not essential when the host control device 103 specifies the TEM observation carrier conveyed to the TEM device 102. After step S1109, steps S1015 to S1020 are executed.

In the present embodiment, it is possible to obtain the same effect as that of the embodiment described above.

Third Embodiment

Next, the third embodiment will be described. FIG. 11 is a schematic configuration diagram showing an example of a semiconductor analysis system according to the third embodiment of the present invention. A semiconductor analysis system 200 of FIG. 11 has a configuration in which an Auto Lamella Transfer System (ALTS: automatic thin film sample conveying device) device 201 is added to the semiconductor analysis system 100 of FIG. 1. The ALTS device 201 is a device that automatically transfers the thin film sample SAM prepared on the semiconductor wafer WAF to the TEM observation carrier CAR. The FIB-SEM device 101, the ALTS device 201, and the TEM device 102 can communicate with each other via the host control device 103. While FIG. 11 shows a configuration having one FIB-SEM device 101, one ALTS device 201, and one TEM device 102, there may be provided a plurality of these, respectively.

The semiconductor wafer WAF with the thin film sample SAM prepared thereon is conveyed to the ALTS device 201. The ALTS device 201 transfers the thin film sample SAM to the TEM observation carrier CAR in the device. At that time, the ALTS device 201 performs the transfer while referring to the position information of the thin film sample SAM on the semiconductor wafer WAF.

In addition, the conveyance of the semiconductor wafer WAF to the ALTS device 201 may be performed for each container or cartridge described above. Further, as described above, some or all of the handling tasks for the semiconductor wafer WAF and the TEM observation carrier CAR may be performed by human or conveyance robot.

In FIG. 11, the host control device 103 is described as an independent component, but the FIB-SEM device 101, the TEM device 102, and the ALTS device 201 may be responsible for some or all of the functions of the host control device 103.

<Configuration of ALTS Device>

FIG. 12 is a schematic configuration diagram showing an example of the ALTS device of FIG. 11. As shown in FIG. 12, the ALTS device 201 includes a first optical microscope 401*a*, a first optical microscope controller 431 that controls the first optical microscope 401*a*, a second optical microscope 402*a*, a second optical microscope controller 432 that controls the second optical microscope 402*a*, a wafer stage 404 on which the semiconductor wafer WAF can be placed, and a wafer stage controller 434 that controls the wafer stage 404.

Further, the ALTS device 201 includes a substage 406 on which a TEM observation carrier CAR can be placed, a substage controller 436 that controls the substage 406, a probe unit 412 that picks up a thin film sample SAM prepared on a semiconductor wafer WAF, a probe unit controller 442 that controls the probe unit 412, and a sample chamber 407.

Further, the ALTS device 201 includes a first camera 410 and a second camera 411 for acquiring an optical microscope image, a first camera controller 440 that controls the first camera 410, a second camera controller 441 that controls the second camera 411, a light source 409 for irradiating the thin film sample SAM with light, a light source controller 439 that controls the light source 409, and an integrated computer 430 that controls the overall operations of the ALTS device 201. The integrated computer 430 and each controller can communicate with each other.

Further, the ALTS device 201 includes a controller 451 (keyboard, mouse, and the like) for the operator to input various instructions such as irradiation conditions, the position of the wafer stage 404, and the like, a GUI screen 453 for controlling the ALTS device 201, and one or a plurality of displays 452 that display the state of the ALTS device 201, various acquired information including images, and the like. The state of the ALTS device 201, the acquired information, and the like may be included in the GUI screen 453.

The first optical microscope 401*a* and the second optical microscope 402*a* are systems that include all the components necessary for the optical microscope, such as a lens for forming an image, an aperture for limiting an opening, and the like. In FIG. 12, the light source 409 is provided in the sample chamber 407, but embodiments are not limited to such a configuration. For example, the light source 409 may be provided inside the optical microscope, so that the thin film sample SAM is irradiated from above.

Further, the ALTS device 201 may be configured to include a mechanism for scanning the focused light on the thin film sample SAM such that a scanned image can be acquired. Further, the thin film sample SAM to be observed is mainly observed at a position (cross point 471) where an optical axis 401c of the first optical microscope 401a and an optical axis 402c of the second optical microscope 402a intersect with each other. This makes it possible to check the 3D positional relationship of the observation target. For example, it is possible to accurately check the positional relationship between the thin film sample SAM on the semiconductor wafer WAF and the probe unit 412 and tweezers (not shown). Further, in FIG. 12, the sample chamber 407 is provided, but since a closed space is not required when observing in the atmosphere, the sample chamber 407 can be omitted.

The wafer stage 404 and the substage 406 can move in a plane or rotationally under the control of the corresponding wafer stage controller 434 and the substage controller 436. Further, the probe unit 412 may not only pick up the thin film sample SAM prepared on the semiconductor wafer WAF, but also have functions such as a contact detection sensor on the wafer surface, a stress sensor, and the like. Further, in order to pick up the thin film sample SAM, tweezers may be used instead of the probe.

In FIG. 12, while the first optical microscope 401a and the second optical microscope 402a are arranged in the sample chamber 407, the type of the microscope is not particularly limited for the purpose of observing the thin film sample SAM. For example, SEM devices may be used for some or all microscopes. In this case, a configuration similar to that in FIG. 2 can be considered. For example, a configuration may be considered, in which a second electron beam column is mounted in the sample chamber 307 instead of the ion beam column 301a in FIG. 2. Further, in this case, for the electron source of the electron beam column used in the ALTS device 201, any one of a field emission type, a schottky type, and a thermionic type may be adapted.

<Semiconductor Analysis Method>

Next, a semiconductor analysis method using the semiconductor analysis system 200 will be described. FIGS. 13 and 14 are flow charts showing an example of the semiconductor analysis method according to the third embodiment of the present invention. In FIG. 13, the steps of the FIB-SEM device 101 and the ALTS device 201 are shown in the left column. FIGS. 13 and 14 are similar to the flow of FIG. 9 of the first embodiment.

When the semiconductor analysis process is started, the semiconductor wafer WAF is conveyed into the FIB-SEM device 101 (step S1301), and the FIB-SEM device 101 reads the ID of the semiconductor wafer WAF (step S1302).

After step S1302, steps S1003 to S1007 are executed. After step S1007, after step S1007, step S1303 is executed.

The semiconductor wafer WAF is taken out from the FIB-SEM device 101 (step S1303) and conveyed to the ALTS device 201 (step S1304). The semiconductor wafer WAF may be conveyed by a single semiconductor wafer WAF, or may be collectively conveyed by using a case that can accommodate a plurality of semiconductor wafers WAF. Further, the semiconductor wafer WAF may be conveyed by human or robot.

At step S1305, the TEM observation carrier CAR is conveyed to the ALTS device 201. Then, the ALTS device 201 reads the ID of the TEM observation carrier CAR (step S1306). However, this step is not essential because the ID may not be assigned to the TEM observation carrier CAR.

At step S1307, the ALTS device 201 inquires the host control device 103 about the thin film sample conveyance conditions that define the conditions for conveying the thin film sample SAM from the semiconductor wafer WAF to the TEM observation carrier CAR.

The thin film sample conveyance conditions may include a machining shape in the FIB-SEM device 101, an SEM image after the machining is completed in the FIB-SEM device 101, and the like, and may include only the information on a position at which the thin film is machined on the semiconductor wafer WAF.

Further, the thin film sample conveyance conditions may include only the driving conditions of the probe unit 412 and the tweezers. Further, when the thin film sample conveyance condition is stored in the ALTS device 201, the thin film sample conveyance condition may include only an ID that specifies an appropriate thin film sample conveyance condition.

The host control device 103 reads the thin film sample conveyance conditions (step S1308) and outputs the read thin film sample conveyance conditions to the ALTS device 201 (step S1309) in response to the inquiry from the ALTS device 201.

The ALTS device 201 sets the thin film sample conveyance conditions output from the host control device 103 (step S1310), and sets the drive conditions for each component based on the thin film sample conveyance conditions. Then, the ALTS device 201 conveys the thin film sample SAM on the semiconductor wafer WAF to the TEM observation carrier CAR according to the set thin film sample conveyance conditions (driving conditions) (step S1311).

At this time, the ALTS device 201 may acquire an SEM image before conveying the thin film sample or an SEM image after conveying the thin film sample, and record these images as the conveyance information. Further, the ALTS device 201 may output the recorded conveyance information and the ID of the TEM observation carrier CAR read at step S1306 to the host control device 103. In this case, the host control device 103 can use the obtained information in the subsequent steps.

When the conveyance of the thin film sample SAM to the TEM observation carrier CAR is completed, the TEM observation carrier CAR is taken out from the ALTS device 201 (step S1312). After step S1312, step S1010 and the subsequent steps shown in FIG. 14 are executed.

In the present embodiment, it is possible to obtain the same effect as that of the embodiment described above.

Fourth Embodiment

Next, the fourth embodiment will be described. Again, in the present embodiment, as in the third embodiment, the ALTS device 201 is added to the semiconductor analysis system. FIGS. 15 and 16 are flow charts showing an example of the semiconductor analysis method according to the fourth embodiment of the present invention. In FIG. 15, the steps of the FIB-SEM device 101 and the ALTS device 201 are shown in the left column. FIGS. 15 and 16 are similar to the flow of FIG. 10 of the second embodiment.

When the semiconductor analysis process is started, steps S1101 and S1301 are executed in parallel. When steps S1005 and S1302 are completed, step S1102 is executed.

At step S1104, when the SEM image of the FIB machined cross section and the reference image match with each other (YES), the process proceeds to step S1401.

At step S1401, the semiconductor wafer WAF on which the thin film sample SAM is prepared is taken out from the FIB-SEM device 101. Further, the FIB-SEM device 101 outputs the wafer information of the semiconductor wafer WAF to the host control device 103. In addition, outputting the wafer information and taking out the semiconductor wafer WAF do not have to be performed at the same time.

For example, the wafer information may include various information such as the FIB machining being completed, the semiconductor wafer WAF being taken out from the FIB-SEM device 101, the time when each machining is performed, and the like. Further, the wafer information may include an SEM image or an SIM image after FIB machining. Further, the wafer information may be output automatically or manually using a network, or may be output via a storage medium.

After step S1401, steps S1402 and S1403 are executed in parallel. At step S1402, the semiconductor wafer WAF is conveyed to the ALTS device 201. After step S1402, step S1305 is executed.

At step S1403, the host control device 103 acquires wafer information output from the FIB-SEM device 101. When the semiconductor wafer WAF is automatically conveyed from the FIB-SEM device 101 to the ALTS device 201, the wafer information also includes the current position of the semiconductor wafer WAF. In particular, when the plurality of FIB-SEM devices 101 and ALTS devices 201 are present, information on the current position of the semiconductor wafer WAF is required.

At step S1404, the host control device 103 reads the thin film sample conveyance conditions. For the thin film sample conveyance conditions to be read, all the contents may be stored in the memory 103a in advance, or they may include information generated based on the information received from the FIB-SEM device 101. When the ALTS device 201 stores the thin film sample conveyance conditions, the thin film sample conveyance conditions stored in the host control device 101 may be IDs that specify the thin film sample conveyance conditions stored in the ALTS device 201.

After step S1404, step S1309 is executed. Then, after steps S1306 and S1309, steps S1310 and S1311 are executed. After step S1311, step S1405 is executed.

At step S1405, the ALTS device 201 outputs the thin film sample conveyance result to the host control device 103. Further, the TEM observation carrier CAR with the thin film sample SAM placed thereon is conveyed to the TEM device 201. Outputting the thin film sample conveyance result and conveying the TEM observation carrier CAR do not have to be performed at the same time. The thin film sample conveyance result may include the ID of the TEM observation carrier CAT with the thin film sample SAM placed thereon, or may include the SEM image after the conveyance of the thin film sample. Further, when the TEM observation carrier CAR is placed on the case for storing the TEM observation carrier or on a cartridge 500 attachable to the TEM device 102 and then conveyed to the TEM device 201, the thin film sample conveyance result may include an optical microscope image such as the TEM observation carrier CAR and the like after the placement on the case or the cartridge 500.

After step S1405, steps S1010 and S1106 and the subsequent steps shown in FIG. 16 are executed.

In the present embodiment, it is possible to obtain the same effect as that of the embodiment described above.

It is to be noted that the present invention is not limited to the embodiments described above, and includes various modified examples. Further, a part of the configuration of an embodiment can be replaced with the configuration of another embodiment, and the configuration of another embodiment can be added to the configuration of an embodiment.

In addition, it is possible to add, delete, and replace other configurations for a part of the configuration of each embodiment. It should be noted that each member and the relative size described in the drawings are simplified and idealized in order to describe the present invention in an easy-to-understand manner, and may have a more complicated shape when implemented.

REFERENCE SIGNS LIST

100, 200: semiconductor analysis system
101: FIB-SEM device
102: TEM device
103: host control device
201: ALTS device
CAR: TEM observation carrier
SAM: thin film sample
WAF: semiconductor wafer

The invention claimed is:

1. A semiconductor analysis system comprising:
a machining device that machines a semiconductor wafer to prepare a thin film sample for observation;
a transmission electron microscope device that acquires a transmission electron microscope image of the thin film sample; and
a control device that controls the machining device and the transmission electron microscope device,
wherein the control device evaluates the thin film sample based on the transmission electron microscope image, updates acquisition conditions of the transmission electron microscope image based on an evaluation result of the thin film sample, outputs the updated acquisition conditions to the transmission electron microscope device, and
uses the updated acquisition conditions to acquire a transmission electron microscope image of a thin film sample different from the thin film sample;
wherein the control device detects from the transmission electron microscope image a position of a thin film machining area in the thin film sample, compares the detected position of the thin film machining area with a set position of the thin film machining area, and calculates an amount of misalignment of the detected position with respect to the set position, wherein the evaluation result includes the amount of misalignment; and
wherein the control device calculates, from the transmission electron microscope image, an amount of damage of the thin film sample due to machining based on a thickness of a damaged layer of the thin film sample, wherein the evaluation result includes the amount of damage.

2. The semiconductor analysis system according to claim 1, wherein the control device offsets an observation position of the thin film sample in the transmission electron microscope according to the amount of misalignment to update TEM observation conditions.

3. The semiconductor analysis system according to claim 1, wherein the control device detects from the transmission electron microscope image a film thickness of the thin film sample, compares the detected film thickness of the thin film sample with a set film thickness, and calculates an amount of thickness deviation of the detected film thickness with respect to the set film thickness, wherein the evaluation result includes the amount of thickness deviation.

4. The semiconductor analysis system according to claim 1, wherein the control device updates the acquisition conditions of the transmission electron microscope image by changing a matching image used for specifying an observation position in the transmission electron microscope by offsetting the matching image based on the amount of misalignment.

5. The semiconductor analysis system according to claim 1, wherein the transmission electron microscope device acquires a scanning transmission electron microscope image as the transmission electron microscope image.

* * * * *